United States Patent
Goel et al.

(10) Patent No.: US 10,410,410 B2
(45) Date of Patent: Sep. 10, 2019

(54) GENERATING VIEWS OF THREE-DIMENSIONAL MODELS ILLUSTRATING DEFECTS

(71) Applicant: Adobe Inc., San Jose, CA (US)

(72) Inventors: Naveen Goel, Noida (IN); Mayur Hemani, New Delhi (IN); Harsh Vardhan Chopra, New Delhi (IN); Amit Mittal, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/948,528

(22) Filed: Apr. 9, 2018

(65) Prior Publication Data

US 2018/0225867 A1     Aug. 9, 2018

Related U.S. Application Data

(62) Division of application No. 15/221,099, filed on Jul. 27, 2016, now Pat. No. 9,978,173.

(51) Int. Cl.
*G06T 17/00* (2006.01)
*G06T 15/04* (2011.01)
(Continued)

(52) U.S. Cl.
CPC .......... *G06T 17/00* (2013.01); *G06K 9/00214* (2013.01); *G06K 9/4652* (2013.01);
(Continued)

(58) Field of Classification Search
None
See application file for complete search history.

(56) References Cited

U.S. PATENT DOCUMENTS

2007/0165025 A1   7/2007   Shen et al.
2013/0083984 A1*  4/2013   Chabanas ............ G06T 7/0012
                                                        382/128
(Continued)

OTHER PUBLICATIONS

Weller, René, and Gabriel Zachmann. "Protosphere: A gpu-assisted prototype guided sphere packing algorithm for arbitrary objects." ACM SIGGRAPH Asia 2010 Sketches. ACM, 2010. (Year: 2010).*

(Continued)

*Primary Examiner* — Vu Nguyen
(74) *Attorney, Agent, or Firm* — Keller Jolley Preece

(57) ABSTRACT

Systems and methods are disclosed for generating viewpoints and/or digital images of defects in a three-dimensional model. In particular, in one or more embodiments, the disclosed systems and methods generate exterior viewpoints by clustering intersection points between a bounding sphere and rays originating from exterior vertices corresponding to one or more defects. In addition, in one or more embodiments, the disclosed systems and methods generate interior viewpoints by clustering intersection points between one or more medial spheres and rays originating from vertices corresponding to interior vertices corresponding to one or more defects. Furthermore, the disclosed systems and methods can apply colors to vertices corresponding to defects in the three-dimensional model such that adjacent vertices in the three-dimensional model have different colors and are more readily discernable.

20 Claims, 20 Drawing Sheets

(51) Int. Cl.
*G06T 15/06* (2011.01)
*G06K 9/62* (2006.01)
*G06T 15/20* (2011.01)
*G06K 9/00* (2006.01)
*G06K 9/46* (2006.01)

(52) U.S. Cl.
CPC ......... *G06K 9/6218* (2013.01); *G06K 9/6223* (2013.01); *G06T 15/04* (2013.01); *G06T 15/06* (2013.01); *G06T 15/205* (2013.01); *G06T 2200/04* (2013.01); *G06T 2200/08* (2013.01)

(56) References Cited

U.S. PATENT DOCUMENTS

| | | |
|---|---|---|
| 2016/0005211 A1 | 1/2016 | Sarkis et al. |
| 2018/0033194 A1 | 2/2018 | Goel et al. |

OTHER PUBLICATIONS

Stolpner, Svetlana, Paul Kry, and Kaleem Siddiqi. "Medial spheres for shape approximation." IEEE Transactions on Pattern Analysis and Machine Intelligence 34.6 (2012): 1234-1240. (Year: 2012).*
U.S. Appl. No. 15/221,099, filed Jan. 11, 2018, Notice of Allowance.

\* cited by examiner

Compute Medial Axis

Generate A Plurality Of Medial Spheres

Generate Rays From Affected Vertices

Identify Intersection Points

Select Medial Sphere(s)

Cluster Intersection Points On
Selected Medial Sphere(s)

Identify Representative Points

Identify Viewpoints

Generate Cut-Planes

Remove Portions Of Three-Dimensional
Model From Viewpoints Based On Cut Planes

Provide Digital Images From Viewpoints
For Display

GENERATING VIEWS OF THREE-DIMENSIONAL MODELS ILLUSTRATING DEFECTS

CROSS REFERENCE TO RELATED APPLICATIONS

The present application is a division of U.S. application Ser. No. 15/221,099, filed Jul. 27, 2016. The aforementioned application is hereby incorporated by reference in its entirety.

BACKGROUND

Recent years have seen a rapid proliferation in modeling and printing three-dimensional objects. Indeed, it is now common for individuals and businesses to create a three-dimensional model of an object utilizing a computing device and then produce a real-world copy of the object utilizing a three-dimensional printer. For example, utilizing conventional three-dimensional printing systems, businesses can now design and print a wide variety of objects, including nanostructures, minute machining parts, medical implants, homes, or even bridges.

Although conventional three-dimensional modeling systems allow users to design and print a wide array of objects, such systems have a variety of problems. For example, in many instances, digital modeling systems generate three-dimensional models that contain defects, errors, or other issues and, therefore, cannot be printed. For instance, a digital three-dimensional model may have minute holes or gaps at vertices or corresponding edges that make the model unsuitable for printing. Similarly, many three-dimensional models frequently contain flipped, duplicate, or overlapping modeling elements.

Users often express frustration with the process of identifying and correcting defects in a digital three-dimensional model (e.g., prior to printing the model to a three-dimensional object). Indeed, it is extremely difficult for users to isolate and correct such defects in order to generate accurate and/or functional printed objects. Some conventional three-dimensional printing systems seek to remedy such concerns by providing an error identification tool to locate and correct defects in three-dimensional models. However, conventional error identification tools also have their own shortcomings. For example, conventional error identification tools present a preview of a three-dimensional model with individual defects marked by a visual indicator. Such conventional tools require the user to manipulate and inspect the three-dimensional model to identify and correct any affected regions. Users often experience frustration with the cumbersome and time consuming process of manipulating a three-dimensional model at various angles and at various zoom levels to identify portions of the model with defects. This frustration is only compounded in three-dimensional models with hollow or otherwise occluded areas, where defects may be inward facing and difficult to identify through user manipulation of the three-dimensional model.

In addition, conventional digital modeling systems often result in a significant number of defects located in small regions of a three-dimensional model. Because a number of defects are often grouped together in a small space, users often have difficulty identifying and differentiating between various defects using conventional three-dimensional modeling systems. Indeed, because conventional three-dimensional modeling systems commonly identify errors with the same visual indicator, users often express frustration in being able to differentiate between errors occurring within a small region within a three-dimensional model.

These and other problems exist with regard to current techniques for identifying, displaying, and/or correcting defects in a three-dimensional model.

BRIEF SUMMARY

Embodiments of the present disclosure provide benefits and/or solve one or more of the foregoing or other problems in the art with systems and methods that generate intelligent viewpoints of defects of affected regions of a three-dimensional model to assist in identifying and remedying defects. For instance, in one or more embodiments, the disclosed systems and methods generate an optimal number of viewpoints (e.g., the minimum number of internal and/or external viewpoints to display all defects in the three-dimensional model) and display the viewpoints to a user in a guided fashion. Moreover, in one or more embodiments, the disclosed systems and methods utilize a local color scheme to ensure that affected elements are easily discernable.

More particularly, in one or more embodiments, the disclosed systems and methods identify an exterior subset of vertices having defects and an interior subset of vertices having defects in a three-dimensional model made up of a plurality of vertices. Moreover, the disclosed systems and methods generate an exterior viewpoint based on a bounding sphere surrounding the three-dimensional model and intersection points between the bounding sphere and rays originating from the exterior subset of vertices. In addition, the disclosed systems and methods generate an interior viewpoint based on a medial sphere within the three-dimensional model and intersection points between the medial sphere and rays originating from the second subset of vertices. The disclosed systems and methods apply a plurality of colors to the exterior subset of vertices and the interior subset of vertices such that all adjacent connected vertices in the exterior subset of vertices and all adjacent connected vertices within the interior subset of vertices are different colors. Furthermore, the disclosed systems and methods provide for display a first digital image of the three-dimensional model and the colored, exterior subset of vertices from the first viewpoint and a second digital image of the three-dimensional model and the colored, exterior subset of vertices from the second viewpoint.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
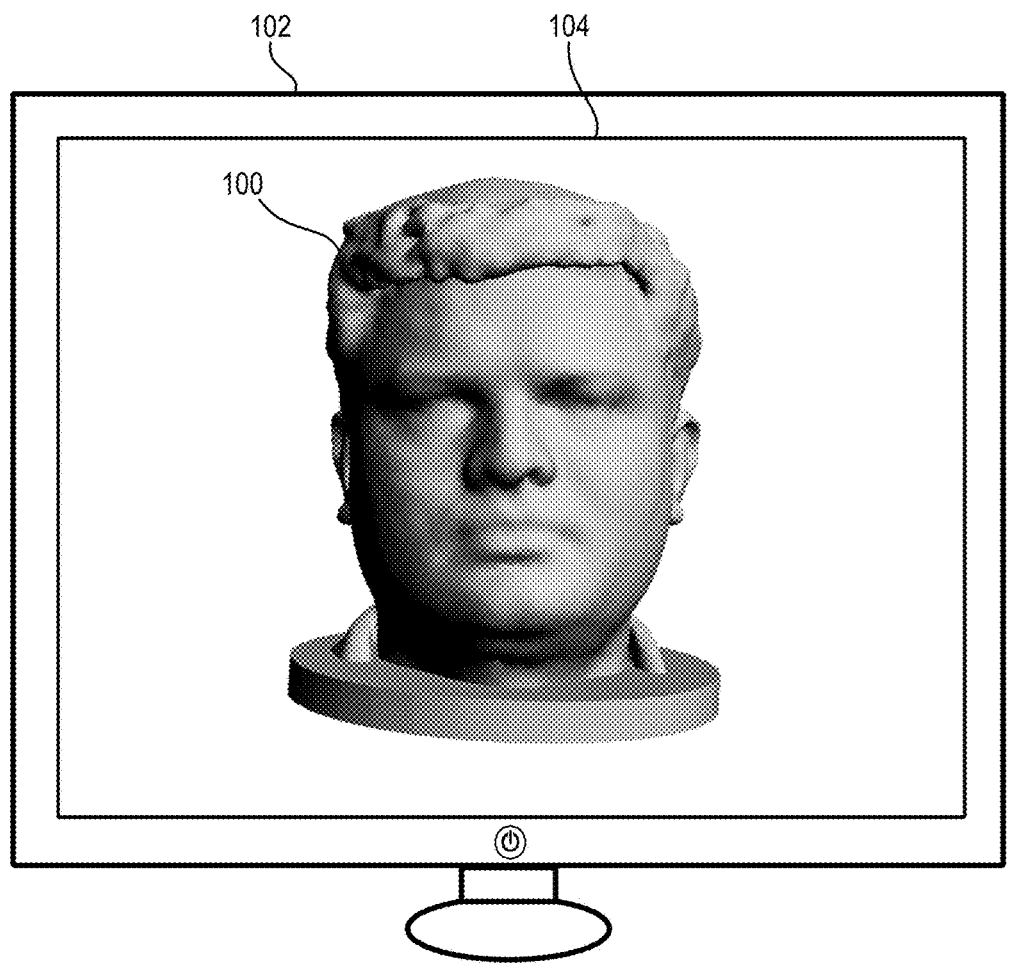
FIG. 1 illustrates a computing device displaying three-dimensional model in accordance with one or more embodiments.

One or more embodiments of the present disclosure include a digital viewpoint generation system and corresponding methods that determine one or more intelligent viewpoints for identifying defects of a three-dimensional model. In particular, in one or more embodiments, the digital viewpoint generation system identifies viewpoints corresponding to defects in a three-dimensional model to assist in identifying and correcting the defects. For instance, in one or more embodiments, the digital viewpoint generation system generates an optimal number of viewpoints of elements with defects in the three-dimensional model and provides digital images based on the viewpoints. Furthermore, in one or more embodiments, the digital viewpoint generation system applies a plurality of individual colors to adjacent elements to assist users in discerning different defects. The digital viewpoint generation system provides digital images illustrating the three-dimensional model and colored vertices based on the identified viewpoints.

As just mentioned, the digital viewpoint generation system creates viewpoints for illustrating defects that occur on the exterior or interior of a three-dimensional model. In particular, the digital viewpoint generation system generates viewpoints and/or digital images illustrating exterior and/or interior elements of a three-dimensional model. Specifically, in one or more embodiments, the digital viewpoint generation system utilizes a bounding sphere and/or a medial sphere to select viewpoints corresponding to defects in interior and/or exterior vertices of a three-dimensional model.

For instance, in one or more embodiments the digital viewpoint generation system generates a bounding sphere that surrounds a three-dimensional model by determining a radius for the bounding sphere that will encompass the three-dimensional model. The digital viewpoint generation system identifies one or more viewpoints based on the bounding sphere by determining intersection points between the bounding sphere and rays (e.g., lines of site) originating at defects of the three-dimensional model. Specifically, the digital viewpoint generation system samples rays emanating from vertices associated with defects of the three-dimensional model and then identifies points where the rays intersect the bounding sphere.

Moreover, in one or more embodiments, the digital viewpoint generation system selects viewpoints based on the intersection points. Specifically, the digital viewpoint generation system applies a clustering algorithm to the intersection points between the bounding sphere and the rays originating from the vertices having defects to generate one or more clusters. The digital viewpoint generation system then creates a representative viewpoint from each of the one or more clusters. In this manner, the digital viewpoint generation system identifies an optimal number of viewpoints that collectively have a line of site to each external vertex having a defect.

As mentioned above, in one or more embodiments, the digital viewpoint generation system also generates viewpoints in relation to internal vertices having defects. In particular, in one or more embodiments, the digital viewpoint generation system identifies internal viewpoints by generating medial spheres within a three-dimensional object. More specifically, in one or more embodiments, the digital viewpoint generation system identifies a medial axis (e.g., a skeleton) corresponding to the three-dimensional model and generates a plurality of medial spheres along a plurality of positions of the medial axis. In one or more embodiments, the digital viewpoint generation system generates rays originating from each internal vertex having defects and identifies intersection points between the medial spheres and the generated rays.

Moreover, in one or more embodiments, the digital viewpoint generation system utilizes intersection points on the medial spheres to identify one or more viewpoints. In particular, the digital viewpoint generation system selects one or more medial spheres with the highest number of intersection points that cover all of the internal vertices having defects. Moreover, the digital viewpoint generation system applies a clustering algorithm to the intersection points on the selected medial spheres to generate one or more clusters. The digital viewpoint generation system then calculates a viewpoint corresponding to each cluster. In this manner, the digital viewpoint generation system identifies an optimal number of viewpoints that collectively cover all internal vertices corresponding to defects in the three-dimensional model.

In addition to generating viewpoints, the digital viewpoint generation system also provides for display one or more digital images based on the viewpoints. For example, in one or more embodiments, the digital viewpoint generation system generates a digital image for each viewpoint to display the defects in a three-dimensional model. Specifically, the digital viewpoint generation system generates digital images for each generated viewpoint and displays vertices with defects with a coloring scheme to allow users to differentiate between individual defects.

For example, in one or more embodiments, the digital viewpoint generation system identifies connected vertices with defects visible from a particular viewpoint. Moreover, the digital viewpoint generation system connects vertices that fall within a particular threshold distance. The digital viewpoint generation system then applies a graph coloring algorithm such that adjacent connected vertices with defects are assigned different colors. In this manner, the digital viewpoint generation system applies different colors to adjacent vertices such that users can easily discern between individual defects in a three-dimensional model.

In one or more embodiments, the digital viewpoint generation system also removes portions of a three-dimensional model from a particular digital image to create a clear view of one or more vertices having a defect. In particular, in one or more embodiments, the digital viewpoint generation system generates a cut plane to remove portions of the three-dimensional model from a view and make vertices more easy to observe. Specifically, in one or more embodiments, the digital viewpoint generation system generates a cut plane by identifying an orientation (e.g., a normal) corresponding to each vertex visible from a particular viewpoint and averaging the orientation (e.g., the normal) corresponding to each vertex. The digital viewpoint generation system then utilizes the cut plane to remove portions of the three-dimensional model.

Advantageously, the digital viewpoint generation system automatically provides an optimal number of viewpoints and corresponding digital images that illustrate defects in a three-dimensional model. This allows users to avoid the time and effort required to manipulate a three-dimensional model to locate and identify individual defects. In addition, by providing viewpoints and corresponding digital images that display each defect, the digital viewpoint generation system reduces the risk of users mistakenly ignoring individual errors in the three-dimensional model.

Furthermore, as described above, the digital viewpoint generation system can provide viewpoints and corresponding digital images in relation to both interior and exterior elements. Indeed, the digital viewpoint generation system allows users to easily identify and address defects in occluded areas of a three-dimensional model. Thus, the digital viewpoint generation system can help reduce or eliminate the frustration and risk associated with defects hidden with a three-dimensional model that are not readily visible from outside the three-dimensional model.

Moreover, as mentioned above, the digital viewpoint generation system also displays defects (i.e., vertices having defects) utilizing an intelligent coloring scheme. In particular, the digital viewpoint generation system analyzes and associates defects to ensure that adjacent defects have different colors. In this manner, the digital viewpoint generation system further assists users in discerning between individual errors in a three-dimensional model and avoids mistakenly ignoring individual errors.

In addition, the digital viewpoint generation system can reduce processing and memory requirements of computing devices implementing the digital viewpoint generation system. Indeed, conventional digital systems often require users to repeatedly zoom, pan, rotate, and/or otherwise modify a three-dimensional model to identify defects. Such manipulation and processing of a three-dimensional image taxes computing resources and causes significant delay in user experience. In one or more embodiments, the digital viewpoint generate system provides digital images that display each defect in a three-dimensional model. Thus, rather than having to manipulate computationally large and complex three-dimensional models, the digital viewpoint generate system provides computationally small and simple digital images that illustrate the defects and significantly reduce amount of computing resources required to identify the defects.

In one or more embodiments, the digital viewpoint generation system also improves functioning of a computing device by identifying a limited number of digital images to provide for display. Indeed, as mentioned above, the digital viewpoint generation system can identify an optimal (e.g., minimum) number of viewpoints that display defects in a digital image. Accordingly, the digital viewpoint generation system can avoid generating excessive viewpoints and utilizing computing resources to provide additional, unnecessary digital images of a three-dimensional model for display.

Additional detail will now be provided regarding the digital viewpoint generation system in relation to illustrative figures portraying exemplary embodiments. In particular, in relation to FIG. 1 disclosure is provided regarding one or more three-dimensional models and defects in the three-dimensional model in accordance with one or more embodiments. Thereafter, with regard to FIGS. 2A-2D, additional disclosure is provided regarding generating a viewpoint corresponding to external vertices having defects in accordance with one or more embodiments. In addition, FIGS. 3A-3C provide additional detail regarding generating a viewpoint corresponding to internal vertices having defects in accordance with one or more embodiments.

As just mentioned, FIG. 1 illustrates a three-dimensional model in accordance with one or more embodiments. In particular, FIG. 1 illustrates a three-dimensional model 100 generated by a computing device 102 and provided for display via a display screen 104.

As used herein, the term "three-dimensional model" refers to a digital representation of a three-dimensional object. In particular, the term "three-dimensional model" includes a three-dimensional mesh. For example, the term "three-dimensional model" includes a three-dimensional mesh (e.g., polygon mesh) of elements, such as vertices, surfaces, and/or connecting edges. For instance, a three-dimensional model includes a mesh defined by a plurality of vertices defining triangular modeling elements that make up the three-dimensional model. A three-dimensional model can also comprise a rendering with one or more wraps, textures, or shells. For example, as illustrated in FIG. 1, the three-dimensional model 100 comprises a plurality of vertices with a shell covering the plurality of vertices to provide an indication of how the three-dimensional model will appear as a printed object.

Moreover, as used herein, the term "vertex" refers to a point of a polygon in a three-dimensional model. In particular, the term "vertex" includes a point of a three-dimensional model comprising a plurality of polygons (e.g., triangular elements). Moreover, as used herein, the term "affected vertex" refers to a vertex associated with at least one defect.

As mentioned previously, in one or more embodiments, the digital viewpoint generation system identifies one or more defects in the three-dimensional model 100. As used herein, the term "defect" refers to a problem (or potential problem) in relation to a three-dimensional model. In particular, the term "defect" refers to anomalies, errors, artifacts, or other issues in a three-dimensional model. In particular, the term "defect" includes holes or gaps at vertices or corresponding edges in a three-dimensional model. Similarly, the term "defect" includes flipped, duplicate, or overlapping modeling elements. For example, the term "defect" includes artifacts in a three-dimensional model that prohibit printing the three-dimensional model utilizing a three-dimensional printer. For instance, the term "defect" includes self-intersecting faces (faces that intersect with other feces in the same mesh); isolated vertices, edges, and/or faces (e.g., a vertex or face that is not connected to the rest of a mesh or an edge connected on only one face); degenerate faces (e.g., faces with a zero area); holes (e.g., missing faces on a mesh); T-vertices (e.g., a vertex that meets an already existing edge); non-manifold edges (edges in a triangulated mesh with more than two faces attached to them); and/or folded faces (e.g., faces the surrounding faces of which have the opposite orientation, sometimes referred to as an inverted normal). The term "defect" includes other issues that undermine the accuracy, appearance, or functionality of a three-dimensional model. For example, the term "defect" includes areas of low structural integrity, areas where the model may be inaccurate (e.g., warped or inaccurate slopes or curved parts), or areas of extreme roughness.

As shown in FIG. 1, the digital viewpoint generation system provides for display a representation of the three-dimensional model. The digital viewpoint generation system also provides for display an indication of defects in the three-dimensional model. For instance, the digital viewpoint generation system provides an indication in relation to one or more vertices or other elements of the three-dimensional model associated with one or more defects.

For example, for isolated vertices, edges, and/or faces, the digital viewpoint generation system adds a bounding ellipsoid of a particular radius to the problematic vertex, edge, and/or face. Similarly, for holes, the digital viewpoint generation system can provide an indication in relation to vertices on the boundary of the hole. Moreover, for T-vertices, the digital viewpoint system can provide an indication in relation to the problematic vertex and the incident face. In addition, for non-manifold edges, the digital viewpoint generation system can provide an indication in relation to vertices on which the edges are incident. Furthermore, for folded faces, the digital viewpoint generation system can provide in indication in relation to all the vertices that constitute the face.

As mentioned above, however, identifying all of the affected areas of the three-dimensional model 100 that comprise defects (e.g., vertices that correspond to defects) can be time consuming and frustrating to users. Indeed, in relation to FIG. 1, in order to identify defects on the back-side, under-side, or top-side of the three-dimensional model 100, a user would need to rotate, pan, and/or zoom the three-dimensional model 100 utilizing the computing device 102 to try and locate each of the defects. The digital viewpoint generation system resolves this problem by generating one or more viewpoints and displaying digital images that collectively illustrate each of the defects of the three-dimensional model 100. In particular, as discussed in greater detail below, the digital viewpoint generation system identifies viewpoints by loading a three-dimensional model, generating a bounding sphere, identifying intersection points between the bounding sphere and rays emanating from vertices of the three-dimensional model, and clustering the intersection points.

As used herein, the term "viewpoint" refers to a visual perspective in three-dimensional space. In particular, the term "viewpoint" includes a position and/or orientation in three-dimensional space. For example, the term "viewpoint" can include a perspective camera object having a position, orientation (e.g., up vector), camera target, and/or view frustrum (e.g., a pyramid of vision bounded by top, bottom, and/or side planes, beginning at a near plane, and/or ending at a far plane). Thus, as described in greater detail below, a "viewpoint" can include a position on a bounding sphere or medial sphere of a three-dimensional model at a particular orientation beginning at a near plane.

For example, FIGS. 2A-2D illustrate a representation of steps in identifying viewpoints and providing digital images from the identified viewpoints for display in accordance with one or more embodiments. The visual representation of the steps shown in FIGS. 2A-2D is provided to aid in describing the process performed by the digital viewpoint generation system. One will appreciate, however, the digital viewpoint generation system may computationally perform the process in a manner in that does not generate some or all of the visual representations shown in FIGS. 2A-2D. For example, FIGS. 2A-2D illustrate visual representations of bounding spheres and rays that the digital viewpoint generation system computationally generates and uses while not necessarily actually building or displaying a visual representation.

Figure 2A:
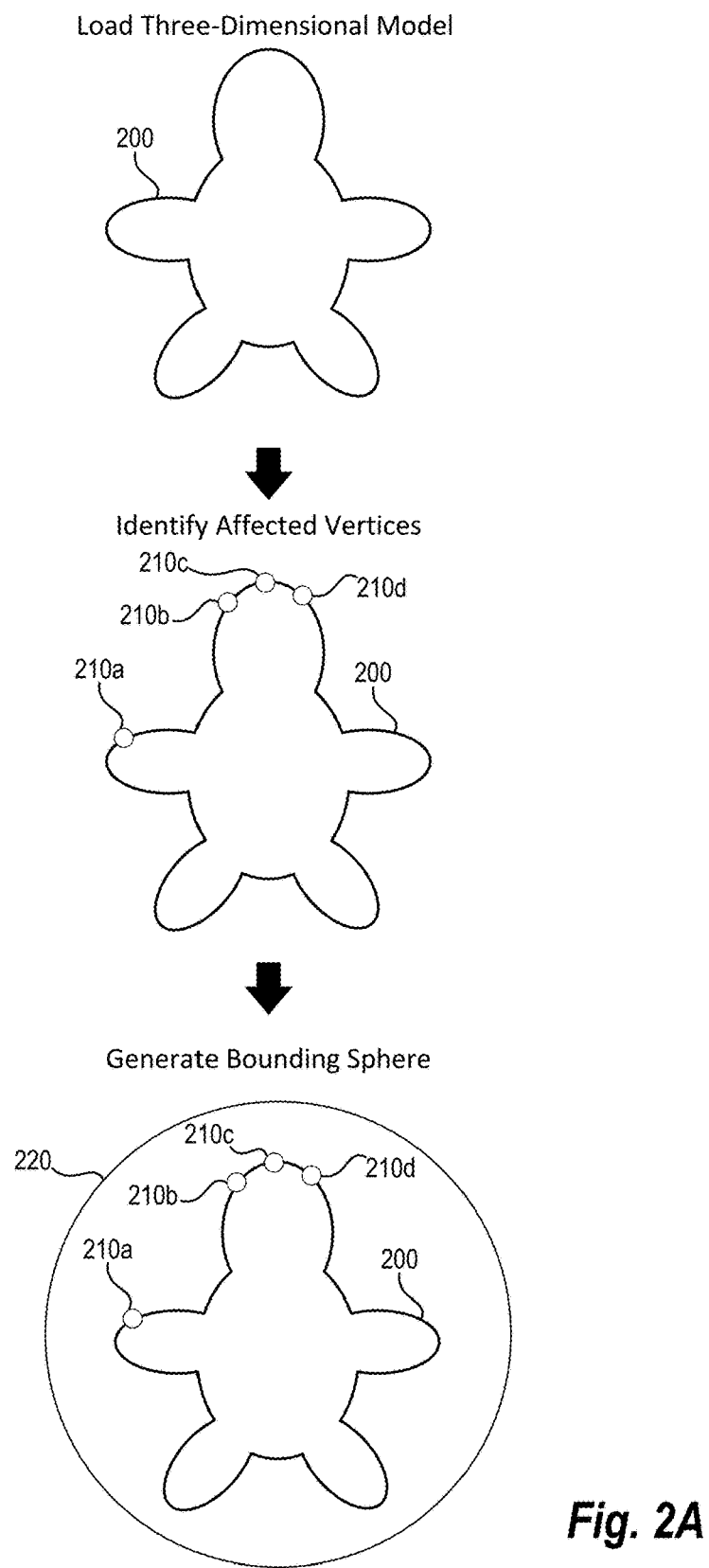
FIGS. 2A-2D illustrate a representation of steps in generating viewpoints of an external set of vertices in accordance with one or more embodiments.
Figure 3A:
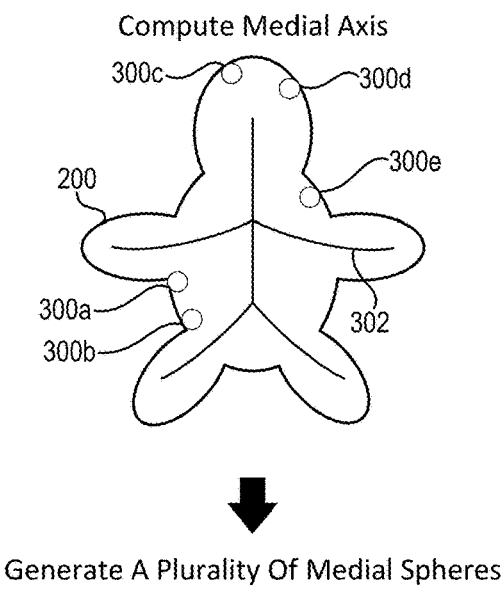
FIGS. 3A-3E illustrate a representation of steps in generating viewpoints of an internal set of vertices in accordance with one or more embodiments.
Figure 3A:
Figure 3A:
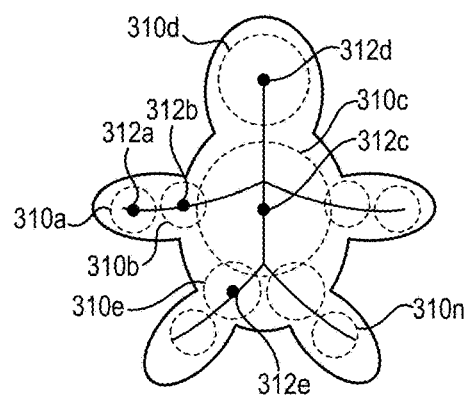
Figure 3A:
Figure 3A:
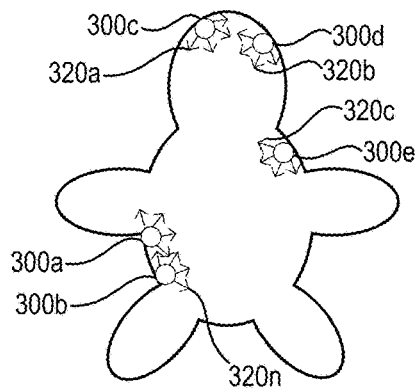
Figure 3B:
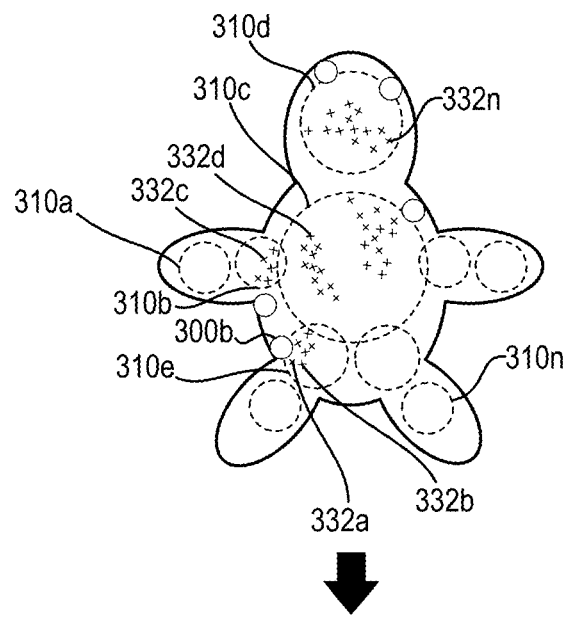
Figure 3B:
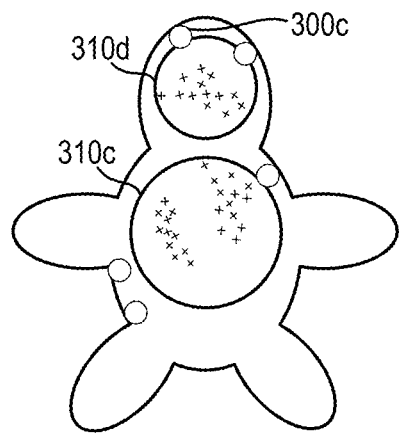
Figure 3C:
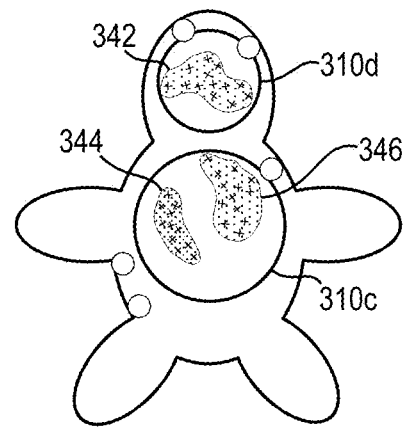
Figure 3C:
Figure 3C:
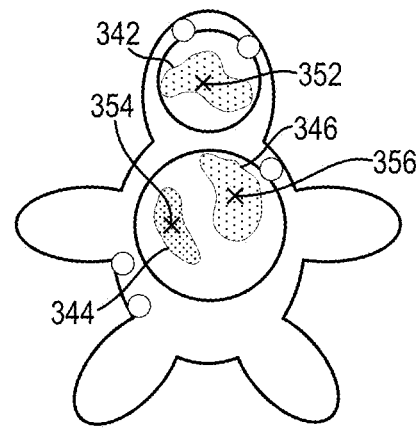

Specifically, FIG. 2A illustrates a simplified representation of three-dimensional model 200. As shown in FIG. 2A, in one or more embodiments, the digital viewpoint generation system loads the three-dimensional model 200. For example, the digital viewpoint generation system utilizes a computing device to load a mesh comprising a plurality of vertices, faces, and/or edges into memory.

Moreover, as further shown in FIG. 2A the digital viewpoint generation system also identifies affected vertices (e.g., vertices with one or more defects). For instance, as shown, the digital viewpoint generation system identifies vertices 210a-210d, each vertex 210a-210d corresponding to one or more defects in the three-dimensional model 200.

It will be appreciated that although FIG. 2A illustrates individual vertices 210a-210d corresponding to one or more defects, in one or more embodiments, the digital viewpoint generation system identifies a group of vertices corresponding to a single defect. For example, in relation to a hole in the three-dimensional model 200, in one or more embodiments, the digital viewpoint generation system identifies a group of vertices on the boundary of the hole.

As mentioned previously, upon identifying vertices corresponding to one or more defects, the digital viewpoint generation system generates a bounding sphere. In particular, in relation to FIG. 2A, the digital viewpoint generation system generates a bounding sphere 220 that surrounds the three-dimensional model 200. As used herein, the term "bounding sphere" refers to a digital item surrounding a three-dimensional model (or a particular portion of a three-dimensional model that a user seeks to review). In particular, the term "bounding sphere" includes a digital item defining a sphere surrounding a three-dimensional model. It will be appreciated that in one or more embodiments, the "bounding sphere" can comprise another digital three-dimensional shape surrounding a three-dimensional model, such as a box, a cube, a pyramid, a triangular prism, an ellipsoid or some other shape. As shown in relation to FIG. 2A, the bounding sphere 220 encompasses the three-dimensional model 200.

In one or more embodiments, the digital viewpoint generation system selects the size of the bounding sphere 220. For example, in one or more embodiments, the digital viewpoint generation system determines a radius (or diameter) of the bounding sphere 220 based on the three-dimensional model 200. In particular, in one or more embodiments, the digital viewpoint generation system identifies a bounding sphere radius of a minimum size to encompass the three-dimensional model (i.e., a bounding sphere with a smaller radius would not encompass the three-dimensional model).

In one or more embodiments, the digital viewpoint generation system generates a bounding sphere with a radius that is a multiple of a minimum bounding sphere radius. For example, in one or more embodiments, the digital viewpoint generation system identifies a bounding sphere of a minimum radius to encompass the three-dimensional model 200 and then multiples the minimum radius by a multiplier to generate the bounding sphere 220 (e.g., multiply by 1.5).

The digital viewpoint generation system can also determine a size of the bounding sphere 220 based on user input. For example, as described in greater detail below, in one or more embodiments, the size of the bounding sphere 220 determines the location of a viewpoint for viewing one or more defects. Accordingly, in one or more embodiments, the digital viewpoint generation system provides a user interface element that receives user input of a size of the bounding sphere 220 (e.g., a user interface element for selection of a preferred zoom level).

As mentioned above, in one or more embodiments, the digital viewpoint generation system also generates rays originating from affected vertices toward a bounding sphere in identifying one or more viewpoints. In particular, the digital viewpoint generation system casts rays from vertices toward a bounding sphere in the direction of a hemisphere oriented based on the normal of each vertex.

Figure 2B:
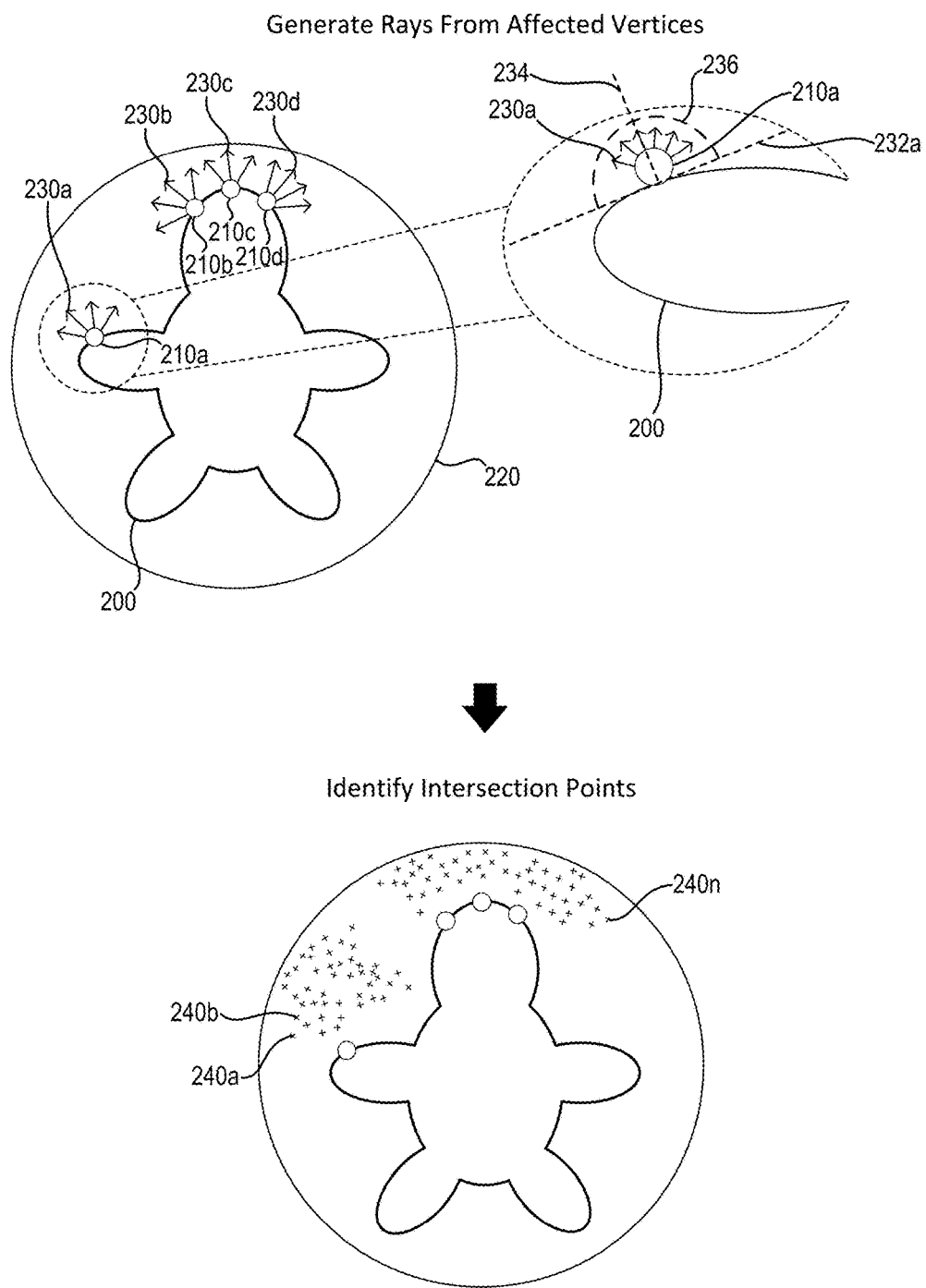

For example, FIG. 2B illustrates generating rays from the vertices 210a-210d in accordance with one or more embodiments. In particular, FIG. 2B illustrates generating rays originating from the vertices 210a-210d and shooting outward from the vertices 210a-210d and the three-dimensional model 200 toward the bounding sphere 220.

As used herein, the term "ray" refers to a digital item representing a line originating from a starting point. In particular, the term "ray" includes a digital item representing a three-dimensional line originating at a vertex of a three-dimensional model in a particular direction. A ray includes a line generated by a ray casting algorithm to identify intersection points. For instance, in relation to FIG. 2B, the digital viewpoint generation system casts rays 230a-230d from the vertices 210a-210d toward a hemisphere oriented at a normal corresponding to each of the vertices 210a-210d.

As used herein, the term "normal" refers to a digital object perpendicular to another object. In particular, the term "normal" includes a digital object perpendicular to one or more elements, such as a vertex, surface, or edge, of a three-dimensional model. For example, the term "normal" includes a normal line (or vector) perpendicular to a plane tangential to a vertex (or surface or edge) in a three-dimensional model. Similarly, a "normal" to a vertex includes a line (or vector) originating from the vertex and running perpendicular to a plane tangential to the vertex in the three-dimensional model.

Indeed, in one or more embodiments, the digital viewpoint generation system identifies a normal in relation to each affected vertex and casts rays from each affected vertex based on the normal. Thus, as shown in FIG. 2B, in relation to the vertex 210a, the digital viewpoint generation system identifies the tangential plane 232a and the normal 234. As shown, the normal 234 is a line perpendicular to the tangential plane 232a at the location of the vertex 210a. The digital viewpoint generation system identifies a hemisphere 236 based on the normal 234. In particular, the digital viewpoint generation system creates the hemisphere 236 such that the hemisphere 236 is centered on the vertex 210a and the central axis of the hemisphere 236 is aligned with the normal 234. Moreover, as shown, the digital viewpoint generation system samples rays 230a emanating from the vertex 210a in the direction of the hemisphere 236.

In one or more embodiments, the digital viewpoint generation system samples rays originating from the vertices 210a-210d in a more limited range of angles than an entire hemisphere. For example, in one or more embodiments, rather than sampling rays originating from the vertices 210a-210d and shooting toward the hemisphere 236, the digital viewpoint generation system samples from a more limited range of angles from each vertex. For instance, the digital viewpoint generation system samples rays shooting outward from the vertex within an inverted cone (e.g., an inverted cone oriented to the normal that excludes 15 degrees of range from the hemisphere 236). In one or more embodiments, the digital viewpoint generation system reduces the angular sampling range to ensure that vertices with defects are plainly visible from resulting viewpoints.

As discussed previously, upon generating rays from affected vertices, in one or more embodiments, the digital viewpoint generation system identifies intersection points. In particular, the digital viewpoint generation system identifies intersection points between the bounding sphere and generated rays. For example, FIG. 2B illustrates the digital viewpoint generation system identifying intersection points 240a-240n.

The digital viewpoint generation system identifies the intersection points 240a-240n by identifying the junction between the bounding sphere 220 and the rays 210a-210d. Specifically, a ray emanating from within a sphere will intersect the sphere in a single location in three-dimensional space. Accordingly, the digital viewpoint generation system calculates the intersection point for each of the rays 210a-210d and the bounding sphere 220. In this manner, the digital viewpoint generation system generates the intersection points 240a-240n.

The digital viewpoint generation system can identify the precise location of the intersection points 240a-240n. For example, in one or more embodiments, the digital viewpoint generation system identifies the location of the intersection points 240a-240n utilizing a spherical coordinate system. Specifically, the digital viewpoint generation system can identify the location of each of the intersection points 240a-240n based on a radius, azimuth and elevation of a fixed origin. More particularly, because each of the intersection points lies on the bounding sphere 220, the digital viewpoint generation system can identify the location of the intersection points 240a-240n based on the azimuth and elevation of each of the intersection points 240a-240n along the radius of the bounding sphere 220.

It will be appreciated that although the embodiment of FIG. 2 utilizes a spherical coordinate system, the digital viewpoint generation system can utilize one or more alternative coordinate systems. For example, the digital viewpoint generation system can also utilize a Cartesian coordinate system, polar coordinate system, or curvilinear coordinate system.

As mentioned, in one or more embodiments, the digital viewpoint generation system clusters intersection points to identify one or more viewpoints. In particular, the digital viewpoint generation system applies a clustering algorithm to intersection points to generate one or more clusters. For example, as shown in FIG. 2C, the digital viewpoint generation system applies a clustering algorithm to the intersection points 240a-240n to generate a first cluster 252 and a second cluster 254.

Figure 2C:
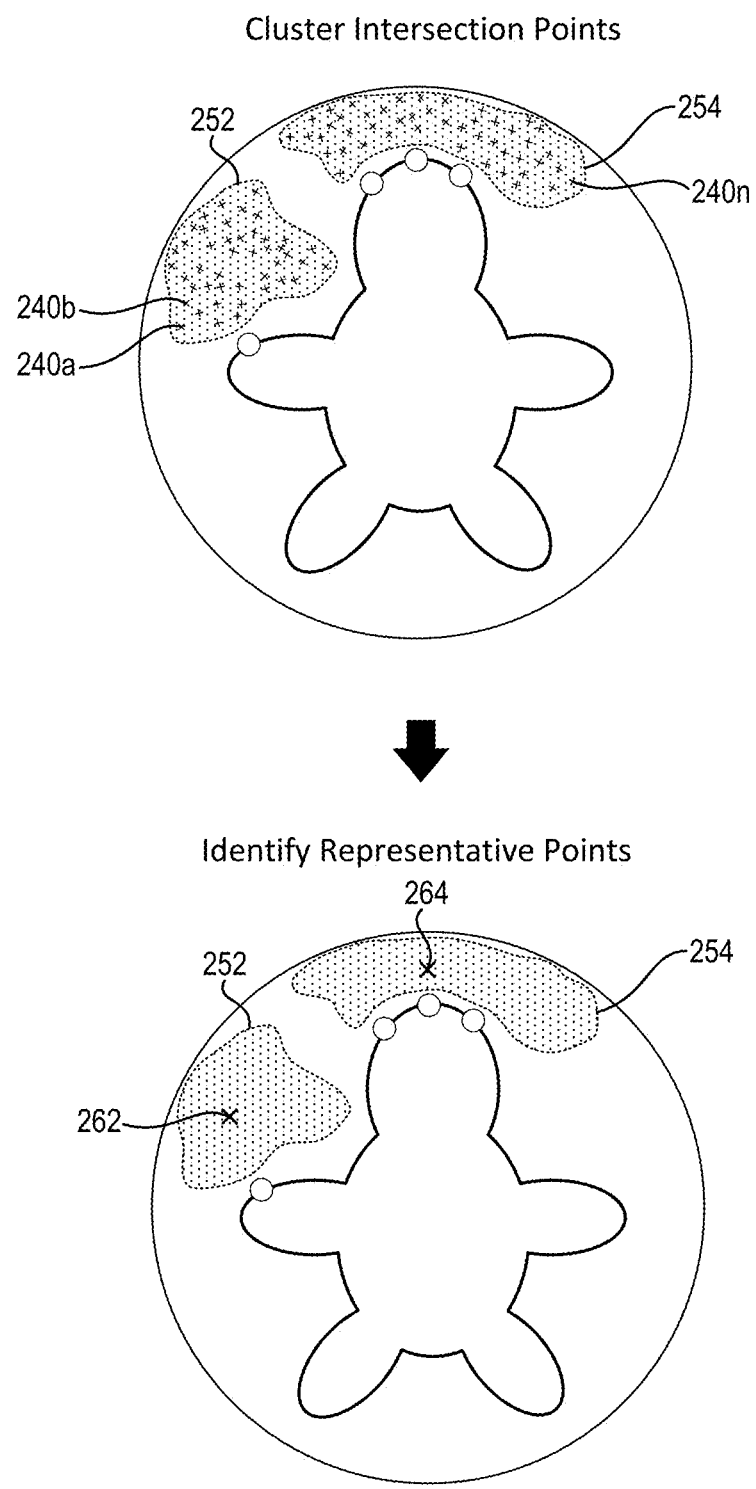

In particular, in relation to the embodiment illustrated in FIG. 2C, the digital viewpoint generation system applies a clustering algorithm to the coordinates of the intersection points 240a-240n. Specifically, the digital viewpoint generation system identifies the azimuth and elevation of each of the intersection points 240a-240n along the radius of the bounding sphere 220 and applies a k-means clustering algorithm to the azimuth and elevation of each of the intersection points 240a-240n. The k-means clustering algorithm generates one or more clusters based on the azimuth and elevation of each intersection point. For example, as shown in FIG. 2C, the digital viewpoint generation system generates the first cluster 252 and the second cluster 254.

Although the embodiment of FIG. 2C utilizes a k-means clustering algorithm, it will be appreciated that the digital viewpoint generation system can utilize other clustering algorithms. For example, in one or more embodiments, the digital viewpoint generation system utilizes BIRCH, hierarchical, expectation-maximization, DBSCAN, OPTICAL, or mean-shift clustering algorithms.

Notably, in one or more embodiments, the digital viewpoint generation system identifies a number of viewpoints based on clusters resulting from applying the clustering algorithm. Indeed, in one or more embodiments, the digital viewpoint generation system generates a number of viewpoints based on the number of clusters. Indeed, as described below, the digital viewpoint generation system utilizes the clusters to generate representative points and viewpoints corresponding to defects in a three-dimensional model. For example, as shown in FIG. 2C, the digital viewpoint generation system identifies a first representative point 262 and a second representative point 264 based on the first cluster 252 and the second cluster 254.

The digital viewpoint generation system can generate the representative points 262, 264 utilizing a variety of techniques. For example, in relation to FIG. 2C, the digital viewpoint generation system averages the azimuth and elevation of each intersection point in a cluster to identify the representative points 262, 264. In particular, the digital viewpoint generation system averages the azimuth and elevation of each intersection point in the first cluster 252 to generate the first representative point 262 and averages the azimuth and elevation of each intersection point in the second cluster 254 to generate the second representative point 264.

In one or more embodiments, the digital viewpoint generation system generates representative points by weighting intersection points based on vertices corresponding to the intersection points. For example, in one or more embodiments, the digital viewpoint generation system first generates an intermediate average of the intersection points corresponding to each vertex. The digital viewpoint generation system then averages the intermediate averages of the intersection points. In this manner, the digital viewpoint generation system weights each of the vertices equally in generating representative points (even though one vertex may have more intersection points).

In other embodiments, the digital viewpoint generation system generates representative points by calculating a centroid. For example, the digital viewpoint generation system calculates an area of the first cluster 252 on the bounding sphere 220 and calculates the centroid of the area of the first cluster 252 on the bounding sphere 220 to generate the first representative point.

Accordingly, as shown in FIG. 2C, the digital viewpoint generation system produces representative viewpoints 262, 264. Specifically, in relation to FIG. 2C, the digital viewpoint generation system identifies an azimuth and zenith at the radius of the bounding sphere 220 for the first representative viewpoint 262 and the second representative viewpoint 264.

Figure 2D:
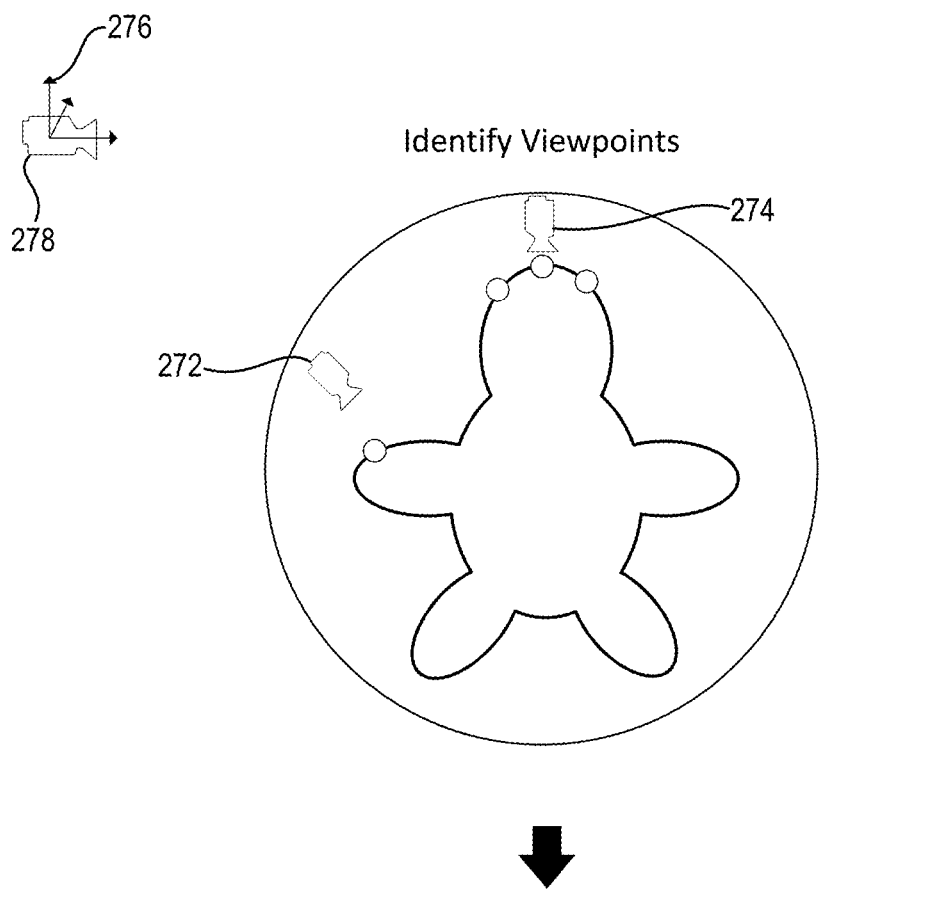

Upon generating representative points, the digital viewpoint generation system identifies viewpoints. For instance, as shown in FIG. 2D, digital viewpoint generation system identifies a first viewpoint 272 and a second viewpoint 274. In particular, the digital viewpoint generation system identifies the first viewpoint 272 based on the first representative point 262 and the second viewpoint 274 based on the second representative point 264.

As illustrated in FIG. 2D, in one or more embodiments, viewpoints are characterized by a perspective camera object (e.g., a camera that captures a digital image from the viewpoint). In particular, viewpoints can be characterized as a position (where the viewpoint is placed) and an orientation (e.g., an up vector). In one or more embodiments, the digital viewpoint generation system defines the viewpoints based on representative points. For example, in relation to FIG. 2D, the position of the viewpoints 272, 274 are defined by the position along the bounded sphere 220 of the representative points 262, 264.

Moreover, in relation to the embodiment of FIG. 2D, the orientation of the camera is also defined by the representative points 262, 264. In particular, the up vector for each of the viewpoints 272, 274 is initially defined in the +Y direction 276 as illustrated in the reference viewpoint 278. The reference viewpoint 278 is then rotated by the azimuth and elevation corresponding to each representative point 262, 264 to generate orientations (e.g., up vectors) for the viewpoints 272, 274.

As shown in FIG. 2D, the viewpoints 272, 274 collectively capture each of the vertices 210a-210d. Indeed, the first viewpoint 272 is within the line of site of the vertex 210a and the second viewpoint 274 is within line of site of each of the vertices 210b-210d. Thus, a digital image illustrating the three-dimensional model from the viewpoints 272, 274 will capture all of the vertices 210a-210d.

Indeed, as discussed above, in one or more embodiments, the digital viewpoint generation system provides one or more digital images for display to allow users to identify and/or resolve defects in a three-dimensional model. As used herein, the term "digital image" refers to a visual representation of a digital item. In particular, the term "digital image" includes a visual representation of a three-dimensional based on a viewpoint. For example, the term "digital image" includes a visual representation of a three-dimensional representation from the perspective of the viewpoint (e.g., a camera object with the position, orientation, frustum of the viewpoint). A "digital image" may change based on user interaction. For example, in one or more embodiments, a "digital image" includes a visual representation of a three-dimensional model displayed via a computing device that can rotate, move, zoom, or otherwise change based on user interaction with the visual representation.

Accordingly, as shown in FIG. 2D, the digital viewpoint generation system can utilize the viewpoints 272, 274 to generate digital images. In particular, the digital viewpoint generation system provides a digital image for display from the first viewpoint 272 and a digital image for display from the second viewpoint 274 that collectively illustrate the vertices 210a-210d.

As described above, in one or more embodiments, the digital viewpoint generation system can create viewpoints in relation to internal and/or external vertices. As used herein, the term "external vertex" (or "external vertices") refers to a vertex of a three-dimensional model that is readily visible from an external viewpoint. As used herein, the term "external viewpoint" refers to a viewpoint on a bounding object (e.g., a bounding sphere) surrounding a three-dimensional model. Accordingly, an "external vertex" includes a vertex corresponding to an external surface of an object that is not occluded from view from an external viewpoint. For example, the vertices 210a-210d illustrated in FIG. 2D comprise external vertices.

As used herein, the term "internal vertex" refers to a vertex of a three-dimensional model that is not readily visible from an external viewpoint. Accordingly, an "internal vertex" includes a vertex of a three-dimensional model corresponding to an internal surface of an object that is occluded from view from an external viewpoint.

In one or more embodiments, the digital viewpoint generation system determines vertices corresponding to one or more defects and determines whether the vertices are internal vertices or external vertices. For instance, in one or more embodiments, the digital viewpoint generation system determines whether vertices are internal vertices or external vertices based on intersection points with a bounded sphere or a medial sphere. For example, the digital viewpoint generation system can cast rays from a vertex toward a hemisphere oriented to a normal of each vertex. If the rays (or a certain percentage, such as a majority, of the rays) intersect a bounded sphere the digital viewpoint generation system can determine that the vertex is an external vertex. If the rays (or a certain percentage of the rays) intersect a medial sphere, the digital viewpoint generation system can determine that the vertex is an internal vertex.

For example, FIGS. 3A-3E illustrate a representation of steps in generating viewpoints in relation to internal vertices. The visual representation of the steps shown in FIGS. 3A-3E is provided to aid in describing the process performed by the digital viewpoint generation system. One will appreciate, however, the digital viewpoint generation system may computationally perform the process in a manner in that does not generate some or all of the visual representations shown in FIGS. 3A-3E. For example, FIGS. 3A-3E illustrate visual representations of medial spheres and rays that the digital viewpoint generation system computationally generates and uses while not necessarily actually building or displaying a visual representation.

In particular, FIG. 3A illustrates the simplified representation of three-dimensional model 200 with vertices 300a-300e corresponding to one or more defects. The vertices 300a-300e are internal vertices in that they appear on an internal surface of the three-dimensional model 200, and, accordingly, are not visible from an external viewpoint. Specifically, the vertices 300a-300e are only visible from within the three-dimensional model 200 (e.g., within a hollow area within the three-dimensional model 200).

As discussed previously, in one or more embodiments, the digital viewpoint generation system generates internal viewpoints by computing a medial axis. As used herein, the term "medial axis" refers to a digital item that approximates a central axis or skeleton of a three-dimensional model. In particular, the term "medial axis" includes a topological skeleton of a three-dimensional model. In addition, "medial axis" includes a set of points (or positions) that are equidistant to boundaries of a three-dimensional model.

In relation to the embodiment of FIG. 3A, the digital viewpoint generation system calculates a medial axis 302 of the three-dimensional model 200. The digital viewpoint generation system can calculate the medial axis 302 utilizing a variety of medial axis algorithms. For example, in one or more embodiments, the digital viewpoint generation system utilizes morphological operators, intersections of distances from boundary sections, curve evolution, level sets, and/or pruning algorithms.

In addition to calculating the medial axis, the digital viewpoint generation system can also generate (or sample) a plurality of medial spheres. As used herein, the term "medial sphere" refers to a sphere within a three-dimensional model. The term "medial sphere" includes a sphere within a three-dimensional model centered on a position of a medial axis of the three-dimensional model. The radius or size of a medial sphere can depend on the size of a three-dimensional model and/or the distance between the position of the medial axis and three-dimensional model. For example, a medial sphere includes a sphere within a three-dimensional model centered on a position of a medial axis of the three-dimensional model and touching two boundaries of the three-dimensional model.

The digital viewpoint generation system can generate a medial sphere with a maximum radius within a three-dimensional model (i.e., a radius that causes the medial sphere to extend from a position of the medial axis to boundaries of a three-dimensional model). In one or more embodiments, the digital viewpoint generation system generates medial spheres having a smaller radius. For example, in one or more embodiments, the digital viewpoint generation system generates medial spheres centered on a position of the medial axis with a radius that is a certain multiple smaller than a maximum radius (e.g., a radius that is 0.75 times the size of the maximum radius).

Accordingly, in one or more embodiments, the digital viewpoint generation system samples a plurality of medial spheres in relation to points of a medial axis. For example, in relation to FIG. 3A, the digital viewpoint generation system generates a plurality of medial spheres 310a-310n within the three-dimensional model 200. In particular, in relation to FIG. 3A, the digital viewpoint generation system generates the plurality of medial spheres 310a-310n based on unique positions (or points) of the medial axis 302. For instance, each of the plurality of medial spheres 310a-310n is centered on a corresponding unique position 312a-312d of the medial axis 302.

Although FIG. 3A illustrates the medial spheres 310a-310n corresponding to the positions 312a-312n, it will be appreciated that the digital viewpoint generation system can generate a larger or smaller number of medial spheres based on a larger or smaller number of points of the medial axis 302. For example, in one or more embodiments, the digital viewpoint generation system generates a medial sphere for each position (i.e., point) of the medial axis 302. In other embodiments, the digital viewpoint generation system samples a particular number of positions of the medial axis 302.

As mentioned previously, in one or more embodiments, the digital viewpoint generation system also generates rays from internal vertices corresponding to one or more defects (i.e., affected internal vertices). For example, as illustrated in FIG. 3A, the digital viewpoint generation system generates (and/or samples) a plurality of rays 320a-320n originating from the vertices 300a-300e. More specifically, as shown, the digital viewpoint generation system samples a plurality of rays originating from each of the vertices 300a-300e toward a hemisphere oriented to a normal to each vertex (i.e., away from the internal surface of the three-dimensional model 200). As discussed previously, the digital viewpoint generation system can also sample a plurality of rays from a more limited range of angles (e.g., from an inverted cone rather than a hemisphere).

Upon generating rays from vertices, in one or more embodiments, the digital viewpoint generation system identifies intersection points between the plurality of medial spheres and the generated rays. For example, in relation to FIG. 3B, the digital viewpoint generation system identifies intersection points 332a-332n in relation to the plurality of medial spheres 310a-310n. Specifically, for each ray, the digital viewpoint generation system determines whether the ray intersects one or more of the plurality of medial spheres 310a-310n and identifies intersection points for each of the one or more intersections. Thus, for instance, the digital viewpoint generation system identifies the intersection point 332b as the point where the ray 320n emanating from the vertex 300b intersects the medial sphere 310e.

Notably, there may be one or more medial spheres without any intersection points. For example, the digital viewpoint generation system did not identify any intersection points in relation to the medial sphere 310a. Similarly, there may be more than one medial sphere with an intersection point corresponding to a single ray. For example, a single ray from the vertex 300b may intersect both the medial sphere 310c and the medial sphere 310e.

As described above, the digital viewpoint generation system can identify intersection points (e.g., utilizing a variety of coordinate systems). In relation to FIG. 3B, the digital viewpoint generation system utilizes a spherical coordinate system corresponding to each medial sphere. For example, the digital viewpoint generation system can identify each intersection point based on an origin (e.g., the center) and radius of the corresponding medial sphere and the azimuth and elevation corresponding to the location of the intersection point on the medial sphere.

Moreover, in one or more embodiments, the digital viewpoint generation system utilizes a distance threshold in identifying intersection points. For example, in one or more embodiments, the digital viewpoint generation system will only identify intersection points between a medial sphere and a ray originating from a vertex if the medial sphere is within a particular distance threshold of the originating vertex. Thus, for example, as shown in FIG. 3B, although rays originating from the vertex 300b may intersect with the medial sphere 310n, the digital viewpoint generation system can determine that medial sphere 310n lies beyond the threshold distance from the vertex 300b. In this manner, the digital viewpoint generation system can identify viewpoints within a closer proximity to individual vertices having defects.

Upon identifying intersection points, in one or more embodiments, the digital viewpoint generation system selects one or more medial spheres. In particular, the digital viewpoint generation system can select one or more medial spheres based on the number of intersection points. To illustrate, in one or more embodiments, the digital viewpoint generation system selects one or more medial spheres with the largest number of intersection points. For example, in relation to FIG. 3B, the digital viewpoint generation system selects the medial spheres 310c and 310d because the medial spheres 310c and 310d have the largest number of intersection points.

In addition to the number of intersection points, the digital viewpoint generation system can also select medial spheres based on vertices corresponding to the intersection points of the medial sphere. In particular, as discussed above, the digital viewpoint generation system can generate viewpoints that comprise all vertices having defects. Accordingly, in one or more embodiments, the digital viewpoint generation system selects medial spheres that collectively cover each internal vertex corresponding to a defect. In other words, the digital viewpoint generation system can select medial spheres such that the selected medial spheres have intersection points that correspond to rays originating from every internal vertex corresponding to a defect.

Thus, in relation to FIG. 3B, the digital viewpoint generation system determines that the medial sphere 310c has the largest number of intersection points. However, the digital viewpoint generation system also determines that the medial sphere 310c lacks intersection points corresponding to the vertex 300c. Accordingly, the digital viewpoint generation system can determine that the medial sphere 310d has the next largest number of intersection points that includes intersection points corresponding to the vertex 300c. Accordingly, the digital viewpoint generation system can identify a set of medial spheres, based on the number of intersection points, that collectively cover all of the internal vertices having defects in the three-dimensional digital model.

As mentioned previously, upon selecting one or more medial spheres, the digital viewpoint generation system can also apply a clustering algorithm to the intersection points corresponding to each selected medial sphere. For example, FIG. 3C illustrates the digital viewpoint generation system applying a clustering algorithm to the intersection points corresponding to the medial spheres 310c, 310d and generating a first cluster 342 (on the medial sphere 310c), a second cluster 344 (on the medial sphere 310c), and a third cluster 346 (on the medial sphere 310d). As described above, the digital viewpoint generation system can identify clusters using a variety of clustering algorithms, including a k-means clustering algorithm.

Upon identifying clusters of intersection points, the digital viewpoint generation systems also identifies representative points. For example, as illustrated in FIG. 3C, the digital viewpoint generation system identifies a first representative point 352 corresponding to the first cluster 342, a second representative point 354 corresponding to the second cluster 344, and a third representative point 356 corresponding to the third cluster 346.

As described above, the digital viewpoint generation system can identify the representative points 352-356 utilizing a variety of methods. For example, the digital viewpoint generation system averages an azimuth and elevation for intersection points of each of the clusters 342-346 to calculate a representative point for each cluster. Similarly, the digital viewpoint generation system can calculate a centroid of an area defined by intersection points to generate the representative points.

Figure 3D:
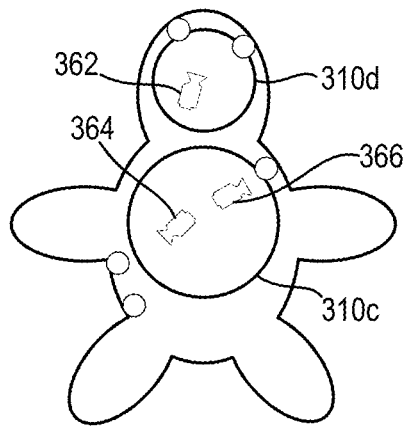
Figure 3D:
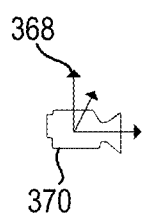
Figure 3D:
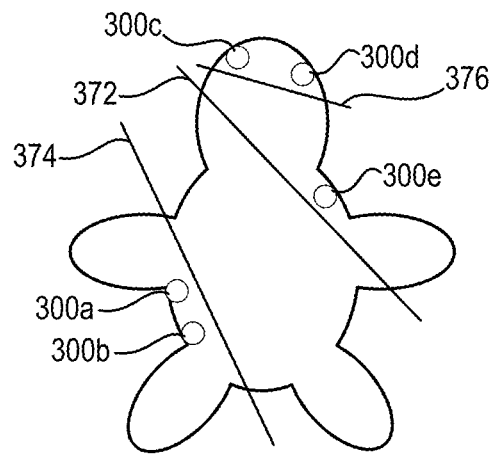

In addition, the digital viewpoint generation system can identify viewpoints based on the representative points on the medial spheres. For example, FIG. 3D illustrates identifying a first viewpoint 362 corresponding to the first representative point 352, a second viewpoint 364 corresponding to the second representative point 354, and a third viewpoint 366 corresponding to the third representative point 356.

To illustrate, the digital viewpoint generation system positions the first viewpoint 362 based on the position of the first representative point 352. Specifically, the digital viewpoint generation system identifies the azimuth and elevation of the first representative viewpoint 352 and positions the first viewpoint 362 at the azimuth and elevation along the radius of the medial sphere 310c.

Similarly, the digital viewpoint generation system orients the first viewpoint 362 based on the first representative point 352. In particular, the digital viewpoint generation system identifies an up vector for the first viewpoint 362 utilizing the azimuth and elevation of the first representative viewpoint 352. Specifically, the digital viewpoint generation system initially sets the up vector for the first viewpoint 362 in the +Y direction 368 as illustrated in the reference viewpoint 370. The digital viewpoint generation system then rotates the up vector for the first viewpoint 362 by the azimuth and elevation corresponding to the first representative viewpoint 352. In this manner, the digital viewpoint generation system generates an orientation for the first viewpoint 362.

In one or more embodiments, the internal viewpoint of a three-dimensional model may be obstructed by other portions (e.g., surfaces) of a three-dimensional model. For example, in relation to a three-dimensional model of an engine, an internal viewpoint of a cylinder of the engine may be obstructed by an engine piston. Accordingly, in one or more embodiments, the three-dimensional model generates a cut plane to remove one or more portions of the three-dimensional model in generating a viewpoint.

As used herein, the term "cut plane" refers to a digital item reflecting a three-dimensional plane utilized to remove one or more portions of a three-dimensional model. In particular, the term "cut plane" includes a three-dimensional plan that removes one or more portions of a three-dimensional model from a digital image generated from a particular viewpoint. For example, the term "cut plane" includes a three-dimensional plane utilized as a near plane of a perspective camera. Setting the "cut plane" as a near plane of the perspective camera ensures that the interior of a three-dimensional model is visible by a user.

In one or more embodiments, the digital viewpoint generation system creates cut planes based on vertices corresponding to the viewpoint. For example, in one or more embodiments, the digital viewpoint generation system identifies the vertices corresponding to the viewpoint (i.e., the vertices with rays contributing to the intersection points utilized to generate the cluster forming the viewpoint). The digital viewpoint generation system can also identify a normal corresponding to each vertex corresponding to the viewpoint. In one or more embodiments, the digital viewpoint generation system averages the normals from the vertices corresponding to the viewpoint to generate a cut plane.

For example, FIG. 3D illustrates generating a first cut plane 372, a second cut plane 374, and a third cut plane 376 (corresponding to the first viewpoint 362, the second viewpoint 364, and the third viewpoint 366, respectively). The viewpoint generation system generates the first cut plane 372 by identifying the normal corresponding to the vertex 300e. In particular, the first cut plane 372 is aligned perpendicular to the normal of the vertex 300e at the position of the third viewpoint 366.

In addition, the second cut plane 374 is based on the vertices 300a, 300b. In particular, the digital viewpoint generation system averages the normals for the vertices 300a, 300b and aligns the second cut plane 374 based on (e.g., perpendicular to) the average of the normals. The digital viewpoint generation system positions the second cut plane 374 at the position of the second viewpoint 364.

Similarly, the digital viewpoint generation system averages the normal of the vertex 300c and the normal of the vertex 300d to generate the third cut plane 376. Moreover, the digital viewpoint generation system positions the third cut plane 376 at the position of the third viewpoint 366.

In one or more embodiments, the digital viewpoint generation system can position the cut plane at a different location than a corresponding viewpoint. For example, in one or more embodiments, the digital viewpoint generation system positions the cut plane at a specified distance from a viewpoint. Similarly, the digital viewpoint generation system can position the cut plane at a point between a viewpoint and a vertex. For instance, the digital viewpoint generation system can position the second cut plane 374 at a mid-point between the second viewpoint 364 and the vertices 300a, 300b.

In one or more embodiments, the digital viewpoint generation system places the cut plane based on the position of a vertex (or average position of a plurality of vertices). For example, the digital viewpoint generation system can place the first cut plane 372 a specified distance from the vertex 300e. In this manner, the digital viewpoint generation system can generate viewpoints that include vertices with defects while ensuring that other portions of a three-dimensional model do not interfere with an illustration of the vertices.

Figure 3E:
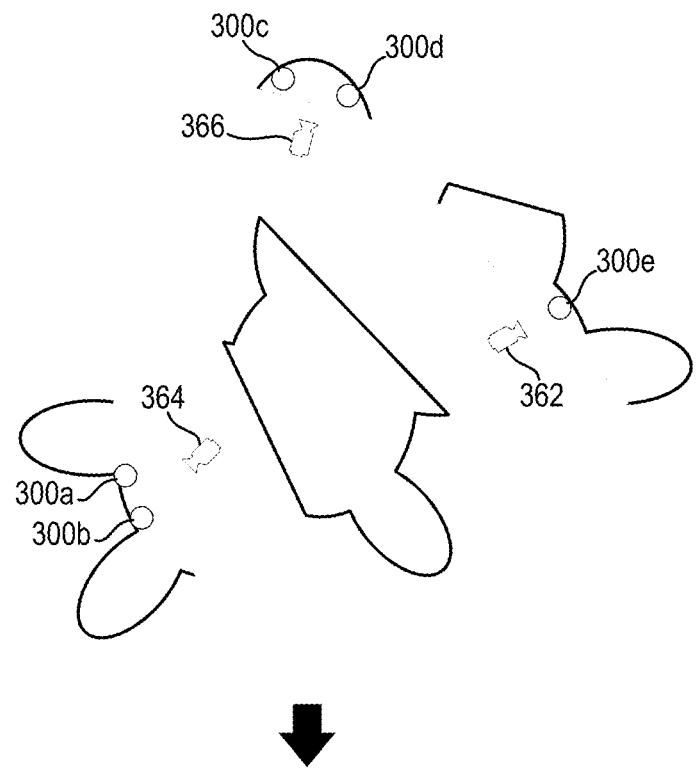

Thus, the digital viewpoint generation system can remove portions of a three-dimensional model in generation viewpoints. For instance, FIG. 3E illustrates removing a portion of a three-dimensional model in relation to the viewpoints 362-366. In particular, the first viewpoint 362 has an unobstructed line of site to the vertex 300e. Similarly, the second viewpoint 364 has unobstructed lines of site to the viewpoints 300a, 300b. Moreover, the viewpoint third 366 has unobstructed lines of site to the viewpoints 300c, 300d.

In addition, as shown in FIG. 3E, in one or more embodiments, the digital viewpoint generation system provides digital images from the viewpoints 362-366 for display. For example, the digital viewpoint generation system can generate a digital image that illustrates the three-dimensional model 200 and the vertex 300e from the first viewpoint 362. Similarly, the digital viewpoint generation system can generate a digital image that illustrates the three-dimensional model 200 and the vertices 300a, 300b from the second viewpoint 364. In addition, the digital viewpoint generation system can generate a digital image that illustrates the three-dimensional model 200 and the vertices 300c, 300d from the third viewpoint 366.

It will be appreciated that, although described separately in relation to FIG. 2D and FIG. 3E, the digital viewpoint generation system can provide digital images for both internal and external vertices. For example, the digital viewpoint generation system can identify internal viewpoints corresponding to internal vertices having defects, identify external viewpoints corresponding to external vertices having defects, and present digital images illustrating the three-dimensional representation from the internal and external viewpoints.

In one or more embodiments, the digital viewpoint generation system provides digital images for display in a guided fashion. For example, the digital viewpoint generation system can provide a first digital image of the first viewpoint 272 illustrating the three-dimensional model and the vertex 210a. Upon user interaction (e.g., selection of a "next view" user interface element or some other user interface element), the digital viewpoint generation system can then provide a second digital image of the second viewpoint 274 illustrating the three-dimensional model 200 and the vertices 210b-210d. Similarly, based on user input, the digital viewpoint generation system can provide a third digital image of the first viewpoint 362, a fourth digital image of the second viewpoint 364, and a fifth digital image of the third viewpoint 366.

Figure 4:
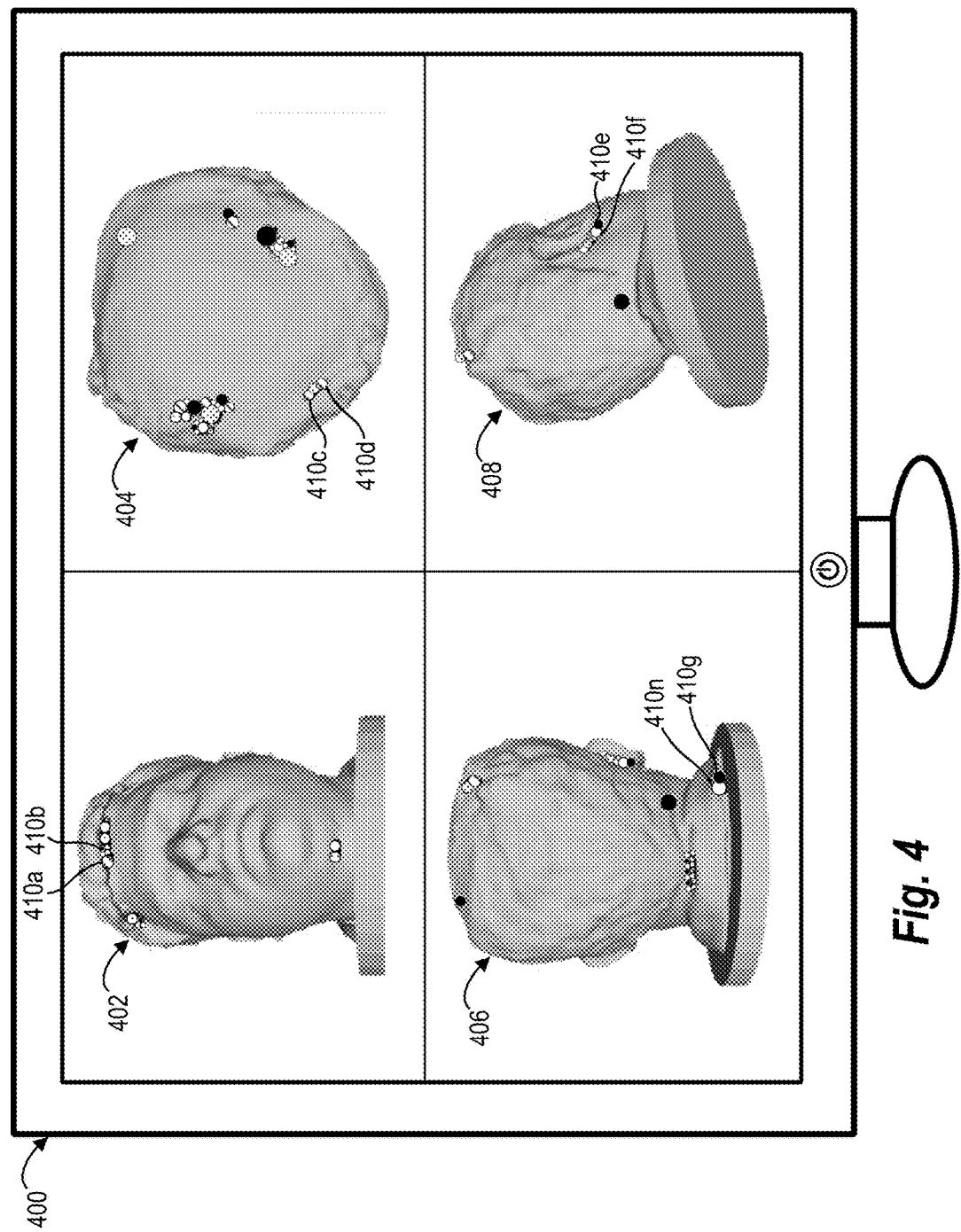
FIG. 4 illustrates a computing device displaying a plurality of digital images of a three-dimensional model and affected vertices in accordance with one or more embodiments.

In addition, in one or more embodiments, the digital viewpoint generation system provides an array or grid of digital images illustrating vertices corresponding to defects. For example, FIG. 4 illustrates a computing device 400 with a display illustrating four digital images 402, 404, 406, 408 of the three-dimensional model 100 from four different viewpoints. As shown in FIG. 4, the digital viewpoint generation system identifies a plurality of vertices corresponding to defects in the three-dimensional model 100. Moreover, the digital viewpoint generation system automatically generates viewpoints and the digital images 402-408 such that the digital images 402-408 collectively display all of the defects identified in the three-dimensional model 100.

Moreover, the digital viewpoint generation system can identify and/or generate an optimal (e.g., smallest number of) digital images. In particular, the digital viewpoint generation system can identify a smallest number of digital images that collectively include each vertex associated with defects in the three-dimensional model. Specifically, as described above, the digital viewpoint generation system can analyze clusters corresponding to intersection points on boundary spheres and/or medial spheres and identify the smallest number of clusters that capture all of the vertices (while also maximizing the number of intersection points). In this manner, the digital viewpoint generation system can generate a minimum number of digital images for a user that capture affected vertices; thus, minimizing the number of digital images a user needs to review to identify each defect in a three-dimensional model while also minimizing the number of digital images a computer device implementing the digital viewpoint generation system is required to generate.

Although the digital images 402-408 of FIG. 4 illustrate external viewpoints corresponding to external vertices, it will be appreciated that the digital viewpoint generation system can also generate digital images illustrating internal viewpoints corresponding to internal vertices.

In one or more embodiments, the digital viewpoint generation system can generate digital images corresponding to particular types of defects. For example, the digital viewpoint generation system can generate viewpoints and digital images that portray only holes in a three-dimensional model. In such circumstances, the digital viewpoint generation system identifies vertices corresponding to the particular type of defect, generates rays from the identified vertices, clusters intersection points, and identifies viewpoints corresponding to the particular type of defect. In this manner, the digital viewpoint generation system can generate a first set of digital images corresponding to a first type of defect (and/or a second set of digital images corresponding to a second type of defect).

As shown in, FIG. 4, the digital viewpoint generation system provides indicators 410a-410n corresponding to elements (i.e., vertices) having one or more defects in the three-dimensional model 100. In particular, for each defect identified in the three-dimensional model 100 (or each defect of a particular type), the digital viewpoint generation system provides an indicator in the digital images 402-408.

As mentioned previously, in one or more embodiments, the digital viewpoint generation system modifies the appearance of adjacent vertices to make the individual defects readily apparent in the three-dimensional model. For example, in one or more embodiments, the digital viewpoint generation system assigns different colors to adjacent vertices in a three-dimensional model.

Indeed, as shown in FIG. 4, each adjacent indicator (or vertex) within the indicators (or vertices) 410a-410n are assigned a different color (the different colors represented as a different hatching within the black and white drawing). Specifically, the digital viewpoint generation system assigns a first color to the indicator (or vertex) 410a and a second color to the indicator (or vertex) 410b. Similarly, the digital viewpoint generation system applies different colors to the indicators (or vertices) 410c, 410d and to the indicators (or vertices) 410e, 410f. In this manner, the digital viewpoint generation system enables users to easily identify different defects in the three-dimensional model 100.

Notably, from the perspective of a user, the digital viewpoint generation system automatically presents the four digital images 402-408, with the indicators 410a-410n, without any manipulation of viewpoints by the user. A user need not rotate, pan, zoom, or otherwise manually manipulate the digital images to locate and identify defects in the three-dimensional model 100. Rather, the digital viewpoint generation system automatically (e.g., upon user interaction with a "preview" element or other user interface element) identifies the defects, generates viewpoints that optimally cover all of the defects, and generates digital images illustrating the defects. Accordingly, the user can focus on reviewing and resolving each of the defects in preparation from printing the three-dimensional model into an object, rather than manipulating the three-dimensional model in an effort to find defects.

As just mentioned, the digital viewpoint generation system can also correct defects in a three-dimensional model. For example, upon displaying digital images illustrating the three-dimensional model and vertices having defects, the digital viewpoint generation system can detect user interaction with vertices having defects. To illustrate, users can select vertices having defects, identify the defects, and remedy the defects. For example, in relation to FIG. 4, a user can select the indicator 410a and the digital viewpoint generation system can provide information regarding the defect corresponding to the indicator 410a (e.g., a text element indicating that the indicator 410a is an inverted normal). Upon user interaction indicating a desire to resolve the defect (e.g., selection of a "fix" user interface element), the digital viewpoint generation system can correct the defect (e.g., correct the inverted normal).

Similarly, a user can interact with an indicator corresponding to any other type of defect and utilize the digital viewpoint generation system to resolve the defect. For instance, a user can select an indicator of one or more vertices corresponding to an area of low structural stability and modify the three-dimensional model to strengthen the stability of the area. Moreover, a user can interact with an indicator of one or more vertices corresponding to a hole in the three-dimensional model and the three-dimensional model can correct the hole.

Furthermore, the digital viewpoint generation system can utilize a three-dimensional printer to print an object corresponding to the three-dimensional model. For example, upon identifying and correcting one or more defects, the digital viewpoint generation system can provide the three-dimensional model to a three-dimensional printer. The three-dimensional printer can utilize the three-dimensional model to build an object that replicates the three-dimensional model.

Figure 5A:
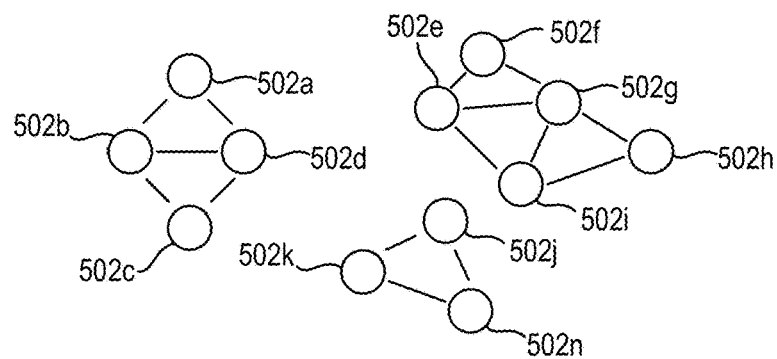
FIGS. 5A-5C illustrate a representation of applying a plurality of colors to adjacent connected vertices in accordance with one or more embodiments.
Figure 5B:
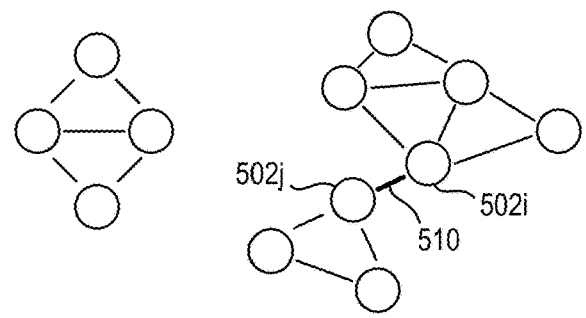
Figure 5C:
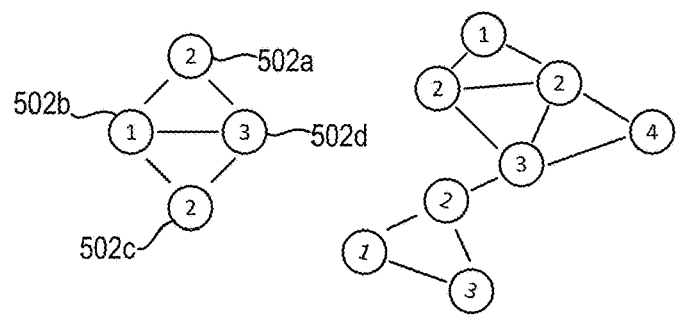

Turning now to FIGS. 5A-5C, additional detail will be provided regarding assigning colors to adjacent vertices in accordance with one or more embodiments. As described above, in one or more embodiments, the digital viewpoint generation system assigns different colors to adjacent connected vertices to assist in identifying different defects in a three-dimensional model. Accordingly, in one or more embodiments, the digital viewpoint generation system identifies and connects vertices before assigning colors corresponding to each vertex.

For example, FIG. 5A illustrates a plurality of vertices 502a-502n. As shown, some of the vertices 502a-502n are already connected in the three-dimensional model. For example, the vertices 502a-502d are each connected by edges in a three-dimensional model. Similarly, the vertices 502e-502i are each connected by edges in a three-dimensional model.

In one or more embodiments, the digital viewpoint generation system connects vertices that are not initially connected based on a distance threshold. For example, although not connected in FIG. 5A, the vertices 502i and 502j are in close proximity (i.e., the vertex 502i falls within a threshold distance of the vertex 502j). Accordingly, as illustrated in FIG. 5B, upon detecting that the vertex 502i falls within a threshold distance of the vertex 502j, the digital viewpoint generation system can add a connection 510 between the vertices 502i and 502j.

Upon connecting vertices that fall within a threshold distance, in one or more embodiments, the digital viewpoint generation system assigns a color indicator corresponding to each vertex. In particular, the digital viewpoint generation system can assign color indicators such that adjacent connected vertices do not have the same color indicator.

In one or more embodiments, the digital viewpoint generation system applies a graph coloring algorithm to assign different color indicators to adjacent connected vertices. The digital viewpoint generation system can utilize a variety of graph coloring algorithms. For example, in one or more embodiments, the digital viewpoint generation system applies a greedy graph coloring algorithm, a first fit algorithm, a degree based ordering algorithm, a largest degree ordering algorithm, a saturation degree ordering algorithm, and/or an incidence degree ordering algorithm.

For example, in relation to FIG. 5C, the digital viewpoint generation system applies a graph coloring algorithm to the vertices 502a-502n. As shown, the graph coloring algorithm assigns a color indicator of "2," "1," "2," and "3" to the vertices 502a, 502b, 502c, and 502d, respectively. In this manner, the digital viewpoint generation system can ensure that adjacent vertices are assigned different colors.

In one or more embodiments, the digital viewpoint generation system assigns colors on extreme ends of a color spectrum to adjacent vertices in an effort to further distinguish the visual appearance of individual defects. For example, in one or more embodiments, the digital viewpoint generation system utilizes extreme hues (i.e., A and B values) from an LAB color space in relation to adjacent vertices. Similarly, in one or more embodiments, the digital viewpoint generation system modifies luminosity with regard to vertices to further assist users in distinguishing between vertices and/or defects.

Figure 6A:
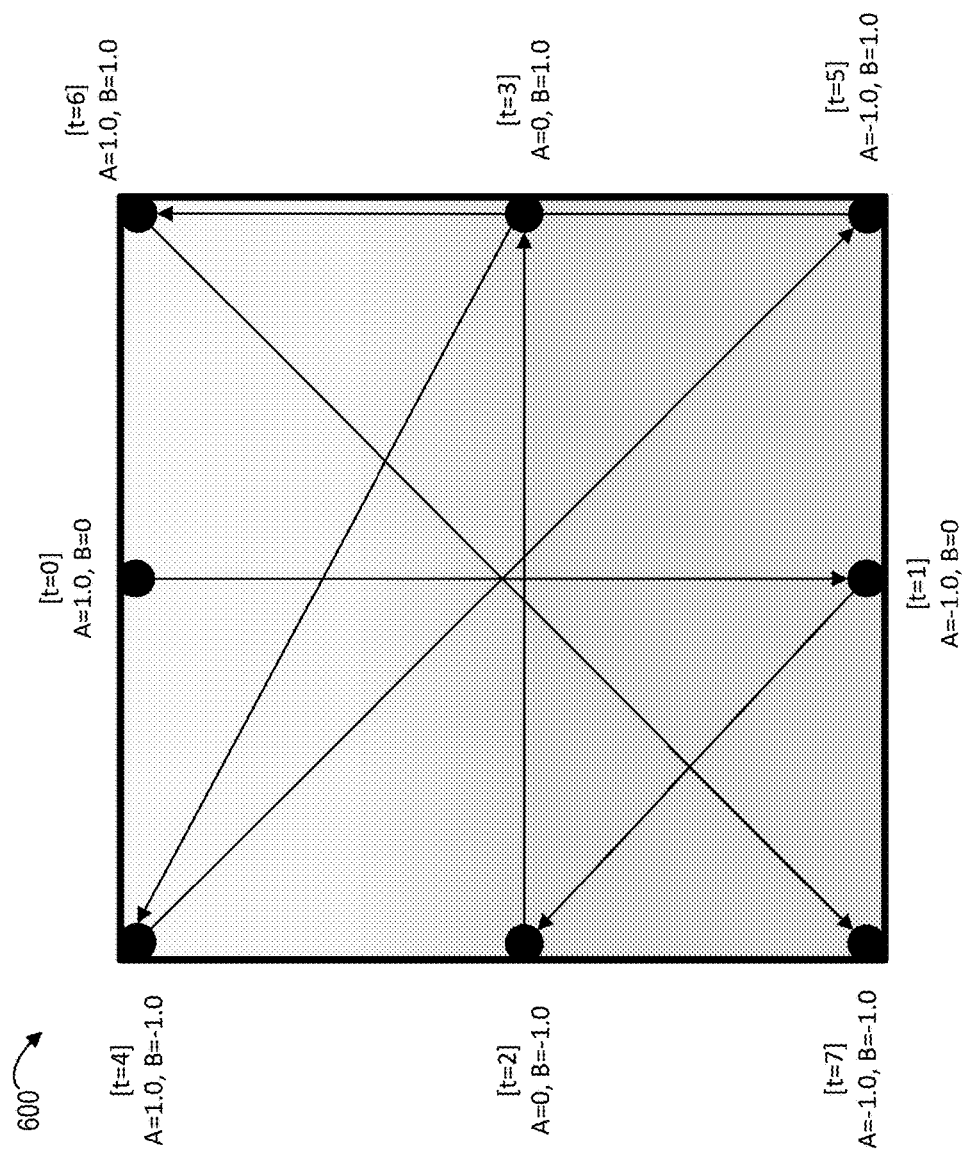
FIG. 6A illustrates a representation of a color space for use in selecting color hues of vertices in accordance with one or more embodiments.

More specifically, in one or more embodiments, the digital viewpoint generation system applies a hue to a vertex corresponding to a defect by cycling between extreme A, B values in an LAB color space. For example, FIG. 6A illustrates a color space 600 with eight different hue values (t=0 through t=7, corresponding to t individual color indices) highlighted. In one or more embodiments, the digital viewpoint generation system assigns a hue value from FIG. 6A based on the color indicator identified in relation to FIG. 5C (i.e., color indicator of 3 equates to t=3 and a corresponding color). In other words, the digital viewpoint generation system assigns A, B values in an LAB color space based on the following equations:

$$A = \begin{cases} -1 \text{ for } t \in \{1, 5, 7\} \\ 0 \text{ for } t \in \{2, 3\} \\ 1 \text{ for } t \in \{0, 4, 6\} \end{cases}$$

-continued $$B = \begin{cases} -1 \text{ for } t \in \{2, 4, 7\} \\ 0 \text{ for } t \in \{0, 1\} \\ 1 \text{ for } t \in \{3, 5, 6\} \end{cases}$$

where t reflects a color indicator corresponding to a vertex (e.g., the color indicators from FIG. 5C). Accordingly, in one or more embodiments, the digital viewpoint generation system assigns a vertex with a color indicator of t=1 to a hue of A=-1, B=0 and a vertex with a color indicator of t=2 to a hue of A=0, B=-1 in the LAB color space.

Figure 6B:
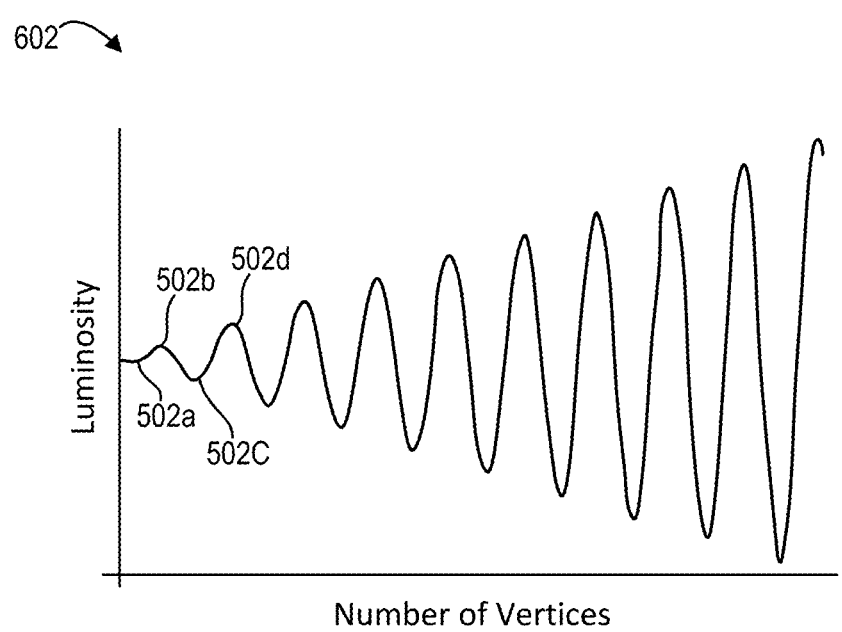
FIG. 6B illustrates a graph for use in selecting luminosities of vertices in accordance with one or more embodiments.

As mentioned, in one or more embodiments, the digital viewpoint generation system also modifies luminosity values in relation to vertices having defects. For example, in one or more embodiments, the digital viewpoint generation system selects more extreme (e.g., light or dark) luminosity values for each subsequent vertex in a three-dimensional model. For example, FIG. 6B illustrates an output of an equation for selecting luminosity values in accordance with one or more embodiments of the digital viewpoint generation system. For each additional vertex, the digital viewpoint generation system selects a more extreme luminosity value. For example, FIG. 6B shows a graph 602 utilized to select luminosity values in accordance with one or more embodiments. Indeed, as shown in relation to the embodiment of FIG. 6B, the digital viewpoint generation system selects a moderately dark luminosity value in relation to the vertex 502a, a moderately light luminosity value in relation to the vertex 502b, a darker luminosity value in relation to the vertex 502c, and a lighter luminosity value in relation to the vertex 502d.

More specifically, in one or more embodiments, the digital viewpoint generation system applies the following equation in selecting a luminosity value:

$$L = 0.5 + \frac{i\sin^2\left(i*\frac{\pi}{2}\right) - 0.5i}{n}$$

where i is an integer number assigned to each vertex from a three-dimensional model (e.g., assigned based on a sequential order of vertices along connections in the three-dimensional model or assigned according to location in the three-dimensional model) and n is the total number of colored vertices. Thus, for example, in relation to an embodiment with thirty vertices with defects, the digital viewpoint generation system can assign a first vertex a luminosity of 0.52, a second vertex a luminosity of 0.47, a third vertex a luminosity of 0.55, a fourth vertex a luminosity of 0.43, a fifth vertex of 0.58, a sixth vertex of 0.4, and so forth. In this manner, the digital viewpoint generation system can further distinguish the appearance of individual defects in a digital image of a three-dimensional model.

In one or more embodiments, the digital viewpoint generation system converts from LAB to RBG color space to produce a separated color palette in relation to each vertex. Furthermore, it will be appreciated that although described in relation to LAB, the digital viewpoint generation system can select colors utilizing any color space, including LAB, RBG, CMYK, HSL, HSV, YUV, $YC_bC_r$, $YP_bP_r$, or grayscale color spaces.

Furthermore, although FIGS. 6A, 6B illustrate a particular method of selecting colors with particular hues and luminosities, it will be appreciated that the digital viewpoint generation system can select colors utilizing a different approach, hues, and luminosities. For example, in one or more embodiments, rather than selecting 8 hues that alternate between A, B values of −1, 0, and 1, the digital viewpoint generation system can select additional hues (e.g., that alternate between A, B values of −1. −0.5, 0, 0.5, and 1) or fewer hues.

Figure 7:
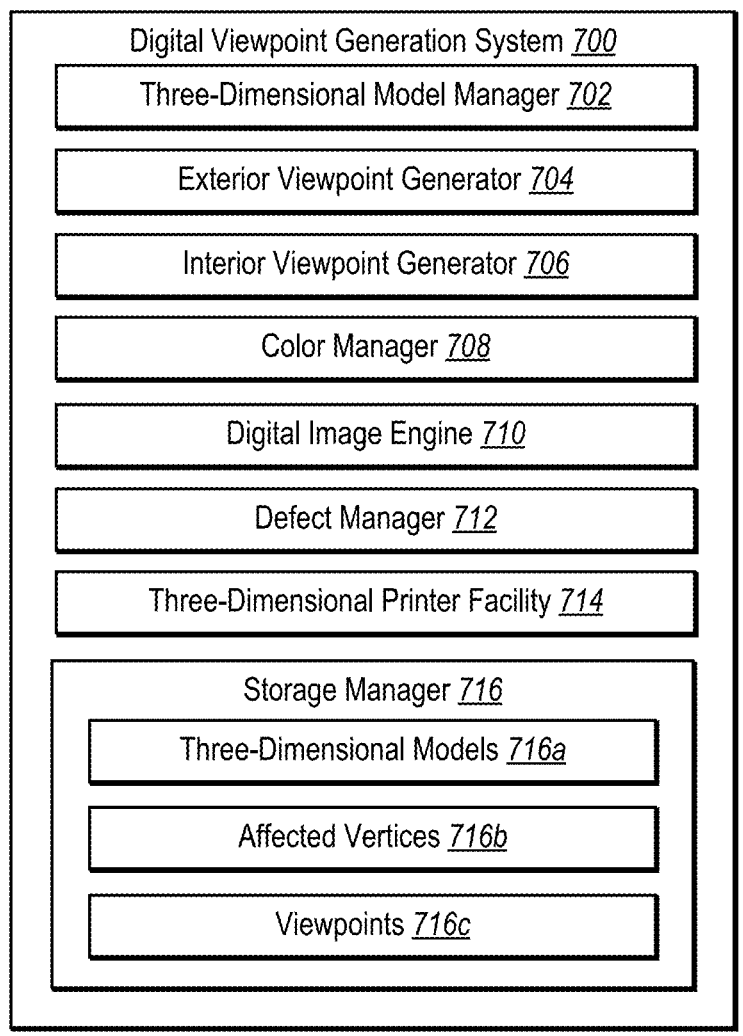
FIG. 7 illustrates a schematic diagram of a digital viewpoint generation system in accordance with one or more embodiments.

Turning now to FIG. 7, additional detail is provided regarding components and capabilities of one embodiment of the digital viewpoint generation system. In particular, FIG. 7 illustrates an embodiment of an exemplary digital viewpoint generation system 700 (e.g., the digital viewpoint generation system referenced above). As shown, the digital viewpoint generation system 700 may include, but is not limited to a three-dimensional model manager 702, an exterior viewpoint generator 704, an interior viewpoint generator 706, a color manager 708, a digital image engine 710, a defect manager 712, a three-dimensional printer facility 714, and a storage manager 716 (comprising three-dimensional models 716a, affected vertices 716b, and viewpoints 716c).

As just mentioned, and as illustrated in FIG. 7, the digital viewpoint generation system 700 includes the three-dimensional model manager 702. The three-dimensional model manager 702 can generate, create, modify, revise, and/or load one or more three-dimensional models. For example, the three-dimensional model manager 702 can create a three-dimensional model and load a mesh of the three-dimensional model comprising a plurality of vertices into memory for purposes of generating a viewpoint and/or digital image of the three-dimensional model.

As shown in FIG. 7, the digital viewpoint generation system 700 also includes the exterior viewpoint generator 704. The exterior viewpoint generator 704 can generate, create, identify, calculate, and/or determine one or more exterior viewpoints. In particular, the exterior viewpoint generator 704 can generate exterior viewpoints corresponding to vertices in a three-dimensional model corresponding to one or more defects. As described above, the exterior viewpoint generator 704 can generate a bounding sphere, sample rays originating from vertices having defects, identify intersection points between a bounding sphere and rays, cluster the intersection points, and identify viewpoints based on the clustered intersection points.

As illustrated in FIG. 7, the digital viewpoint generation system also includes the interior viewpoint generator 706. The interior viewpoint generator 706 can generate, create, identify, calculate, and/or determine one or more interior viewpoints. In particular, the interior viewpoint generator 706 can generate interior viewpoints corresponding to vertices in a three-dimensional model corresponding to one or more defects. As described above, the interior viewpoint generator 706 can generate a medial axis, sample medial spheres in relation to positions on the medial axis, sample rays originating from the vertices having defects, identify intersection points between the medial spheres and the rays, select medial spheres covering the vertices having defects based on the number of intersection points, cluster the intersection points on the selected medial spheres, and generate viewpoints based on the clustered intersection points.

In addition to the interior viewpoint manager, as shown in FIG. 7, the digital viewpoint generation system 700 also includes the color manager 708. The color manager 708 can identify, select, determine, and/or apply colors to elements of a three-dimensional model. In particular, the color manager 708 can select colors for vertices corresponding to defects in a three-dimensional model such that adjacent vertices have different colors. In particular, as described above, the color manager 708 can alter hues and luminosities of indicators corresponding to vertices such that adjacent connected vertices have different colors.

As illustrated in FIG. 7, the digital viewpoint generation system 700 also includes the digital image engine 710. The digital image engine 710 can generate, create, render, and/or provide for display one or more digital images. In particular, the digital image engine 710 can provide for display (e.g., via a user interface and display screen operatively connected to a computing device) a digital image from an interior or exterior viewpoint of a three-dimensional model. For example, the digital image engine 710 can provide for display one or more digital images from an interior and/or exterior viewpoint that illustrate a three-dimensional rendering of a three-dimensional image and one or more defects.

For example, as described above, the digital image engine 710 can provide a plurality of digital images for display that collectively illustrate vertices corresponding to all detected defects in the three-dimensional image. Moreover, the digital image engine 710 can display vertices corresponding to particular colors (e.g., colors assigned by the color manager 708). Accordingly, the digital image engine 710 can provide digital images for display illustrating a three-dimensional model and colored (internal and/or external) vertices such that adjacent connected vertices have different colors.

As shown in FIG. 7, the digital viewpoint generation system 700 also includes the defect manager 712. The defect manager 712 can identify, locate, categorize, correct, fix, and/or resolve defects in a three-dimensional model. In particular, the defect manager 712 can identify elements (e.g., vertices, edges, or surfaces) having one or more defects. Moreover, the defect manager 712 can identify elements or vertices corresponding to the one or more defects.

Similarly, the defect manager 712 can resolve, correct, repair, and/or fix defects in a three-dimensional model. For example, in one or more embodiments, the defect manager 712 can resolve defects based on user input. In particular, the defect manager 712 can provide a defect for display to a user, a user can provide user input confirming that the defect manager 712 has properly identified the defect and the defect should be resolved, and the defect manager 712 can fix the defect.

In addition to the defect manager 712, as shown in FIG. 7, the digital viewpoint generation system 700 also includes the three-dimensional printer facility 714. The three-dimensional printer facility 714 can format, modify, render, and/or convert a three-dimensional model for printing via a three-dimensional printer. For example, the three-dimensional printer facility 714 can generate instructions for a three-dimensional printer for how to print a three-dimensional model (e.g., generate data indicating steps, locations, and/or materials for printing the three-dimensional model).

Moreover, as illustrated in FIG. 7, the digital viewpoint generation system 700 also includes the storage manager 716. The storage manager 510 maintains data to perform the functions of the digital viewpoint generation system 700. As illustrated, the storage manager 716 includes three-dimensional models 716a (e.g., meshes, vertices, edges, or surfaces), affected vertices 716b (e.g., vertices corresponding to one or more defects), and viewpoints 716c (e.g., internal or external viewpoints).

Each of the components 702-716 of the digital viewpoint generation system 700 and their corresponding elements (as shown in FIG. 7) may be in communication with one another using any suitable communication technologies. It will be recognized that although components 702-716 of the digital viewpoint generation system 700 and their corresponding elements are shown to be separate in FIG. 7, any of components 702-716 and their corresponding elements may be combined into fewer components, such as into a single facility or module, divided into more components, or configured into different components as may serve a particular embodiment.

The components 702-716 of the digital viewpoint generation system 700 and their corresponding elements can comprise software, hardware, or both. For example, the components 702-716 and their corresponding elements can comprise one or more instructions stored on a computer-readable storage medium and executable by processors of one or more computing devices. When executed by the one or more processors, the computer-executable instructions of the digital viewpoint generation system 700 can cause a client device and/or a server device to perform the methods described herein. Alternatively, the components 702-716 and their corresponding elements can comprise hardware, such as a special purpose processing device to perform a certain function or group of functions. Additionally, the components 702-716 and their corresponding elements can comprise a combination of computer-executable instructions and hardware.

Furthermore, the components 702-716 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-716 may be implemented as a stand-alone application, such as a desktop or mobile application. Furthermore, the components 702-716 may be implemented as one or more web-based applications hosted on a remote server. The components 702-716 may also be implemented in a suit of mobile device applications or "apps." To illustrate, the components 702-716 may be implemented in an application, including but not limited to ADOBE® PHOTOSHOP® or ADOBE® 3D PRINT SDK software. "ADOBE," "PHOTOSHOP," and "3D PRINT SDK" are either registered trademarks or trademarks of Adobe Systems Incorporated in the United States and/or other countries.

Figure 8:
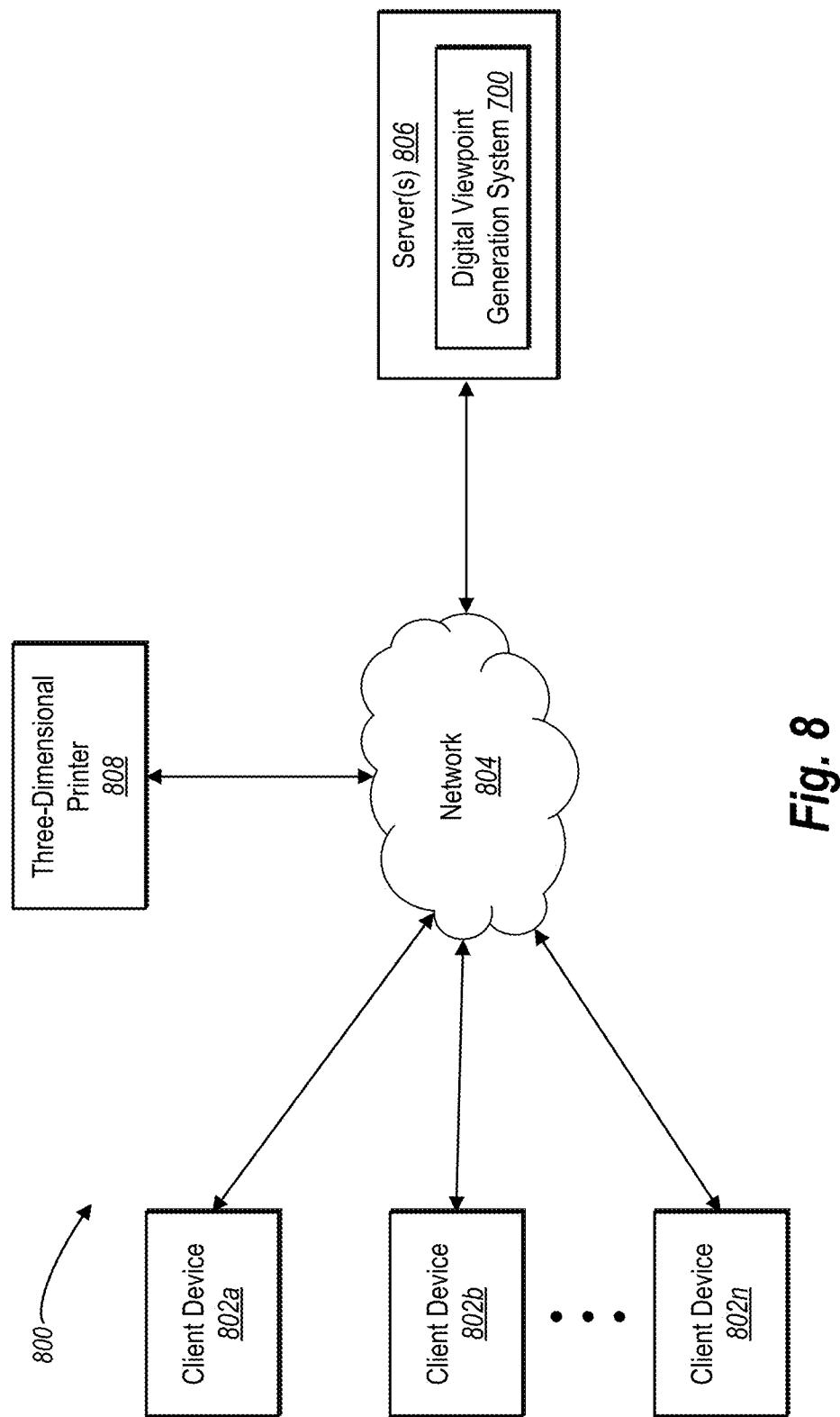
FIG. 8 illustrates a schematic diagram of an exemplary environment in which the digital viewpoint system can operate in accordance with one or more embodiments.

FIG. 8 illustrates a schematic diagram of one embodiment of an exemplary environment 800 in which the digital viewpoint generation system 700 can operate. In one or more embodiments, the exemplary environment 800 includes one or more client devices 802a, 802b, . . . 802n, a network 804, server(s) 806, and a three-dimensional printer 808. The network 804 may be any suitable network over which the computing devices can communicate.

As illustrated in FIG. 8, the environment 800 may include client devices 802a-802n. The client devices 802a-802n may comprise any computing device (e.g., the computing device 102 and the computing device 400). For instance, in one or more embodiments, one or more of the client devices 802a-802n comprise any computing device described below in relation to FIG. 12.

In addition, the environment 800 may also include the server(s) 806. The server(s) 806 may generate, store, receive, and transmit any type of data, including three-dimensional models 716a, affected vertices, 716b, and/or viewpoints 716c. For example, the server(s) 806 may transmit data to a client device, such as the client device 802a. The server(s) 806 can also transmit electronic messages between one or more users of the environment 800. In one example embodiment, the server(s) 806 comprise a content server. The server(s) 806 can also comprise a communication server or a web-hosting server.

As shown in FIG. 8, the environment 800 may also include the three-dimensional printer 808. The three-dimensional printer 808 can create three-dimensional objects based on a three-dimensional model. For example, the three-dimensional printer 808 can comprise a microscale or nanoscale three-dimensional printer. Similarly, the three-dimensional printer 808 can comprise a large-scale three-dimensional printer for industrial, educational, or construction applications.

As illustrated, in one or more embodiments, the server(s) 806 can include all, or a portion of, the digital viewpoint generation system 700. In particular, the digital viewpoint generation system 700 can comprise an application running on the server(s) 806 or a portion of a software application that can be downloaded from the server(s) 806. For example, the digital viewpoint generation system 700 can include a web hosting application that allows the client devices 802a-802n to interact with content hosted at the server(s) 806. To illustrate, in one or more embodiments of the exemplary environment 800, one or more client devices 802a-802n can access a webpage supported by the server(s) 806. In particular, the client device 802a can run an application to allow a user to access, view, and/or interact with a webpage or website hosted at the server(s) 806.

Although FIG. 8 illustrates a particular arrangement of the client devices 802a-802n, the network 804, the server(s) 806, and the three-dimensional printer 808, various additional arrangements are possible. For example, while FIG. 8 illustrates multiple separate client devices 802a-802n communicating with the server(s) 806 via the network 804, in one or more embodiments a single client device may communicate directly with the server(s) 806, bypassing the network 804.

Similarly, although the environment 800 of FIG. 8 is depicted as having various components, the environment 800 may have additional or alternative components. For example, the digital viewpoint generation system 700 can be implemented on a single computing device. In particular, the digital viewpoint generation system 700 may be implemented in whole by the client device 802a or the digital viewpoint generation system 700 may be implemented in whole by the server(s) 806. Alternatively, the digital viewpoint generation system 700 may be implemented across multiple devices or components (e.g., utilizing the client devices 802a-802n and the server(s) 806).

By way of example, in one or more embodiments, the client device 802a sends a request to the server(s) 806 to generate a three-dimensional model. For instance, the client device 802a can provide user input to the server(s) 806 defining a plurality of vertices for a three-dimensional model (e.g., via the three-dimensional model manager 702). The server(s) 806 can generate a three-dimensional model based on the user input (e.g., via the three-dimensional manager 702). The client device 802a can send a request to the server(s) 806 to generate a preview of the three-dimensional model displaying any defects prior to printing. In response, the server(s) 806 can identify defects in the three-dimensional model (e.g., via the defect manager 712) and generate at least one exterior viewpoint and/or at least one interior viewpoint (e.g., via the exterior viewpoint generator 704 and the interior viewpoint generator 706). The server(s) 806 can also provide one or more digital images of the at least one exterior viewpoint and/or the at least one interior viewpoint for display to the client device 802*a* (e.g., via the digital image engine 710). In particular, the server(s) 806 can provide one or more digital images that illustrate the three-dimensional model and defects identified in the three-dimensional model. Moreover, the server(s) can assign colors (e.g., via the color manager 708) to vertices corresponding to each of the defects, such that the digital images display, at the client device 802*a*, adjacent connected vertices in different colors.

Furthermore, the client device 802*a* can provide user input in relation to the digital images and send a request to the server(s) 806 to correct one or more defects in the three-dimensional image (e.g., via the defect manager 712). The server(s) 806 can correct the one or more defects and provide the corrected three-dimensional model to the client device 802*a* (e.g., via the three-dimensional model manger 702). Moreover, the client device 802*a* can send a request to the client device 802*b* (e.g., a provider of three-dimensional printing services). The client device 802*b* can send a request to the three-dimensional printer 808 (e.g., via the three-dimensional printer facility 714) to create a three-dimensional object corresponding to the three-dimensional model.

Figure 9:
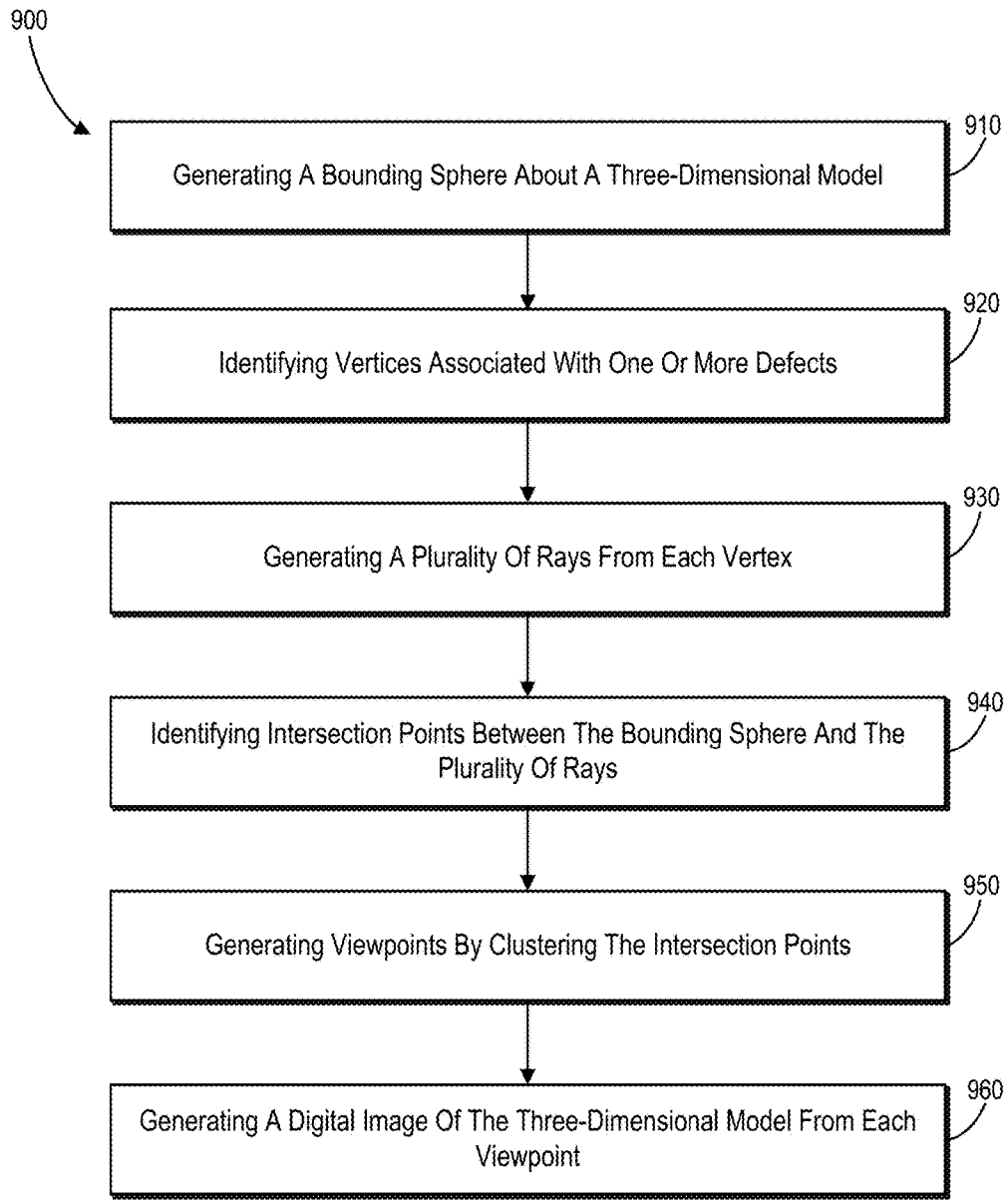
FIG. 9 illustrates a flowchart of a series of acts in another method of generating viewpoints of defects of a three-dimensional model in accordance with one or more embodiments.
Figure 10:
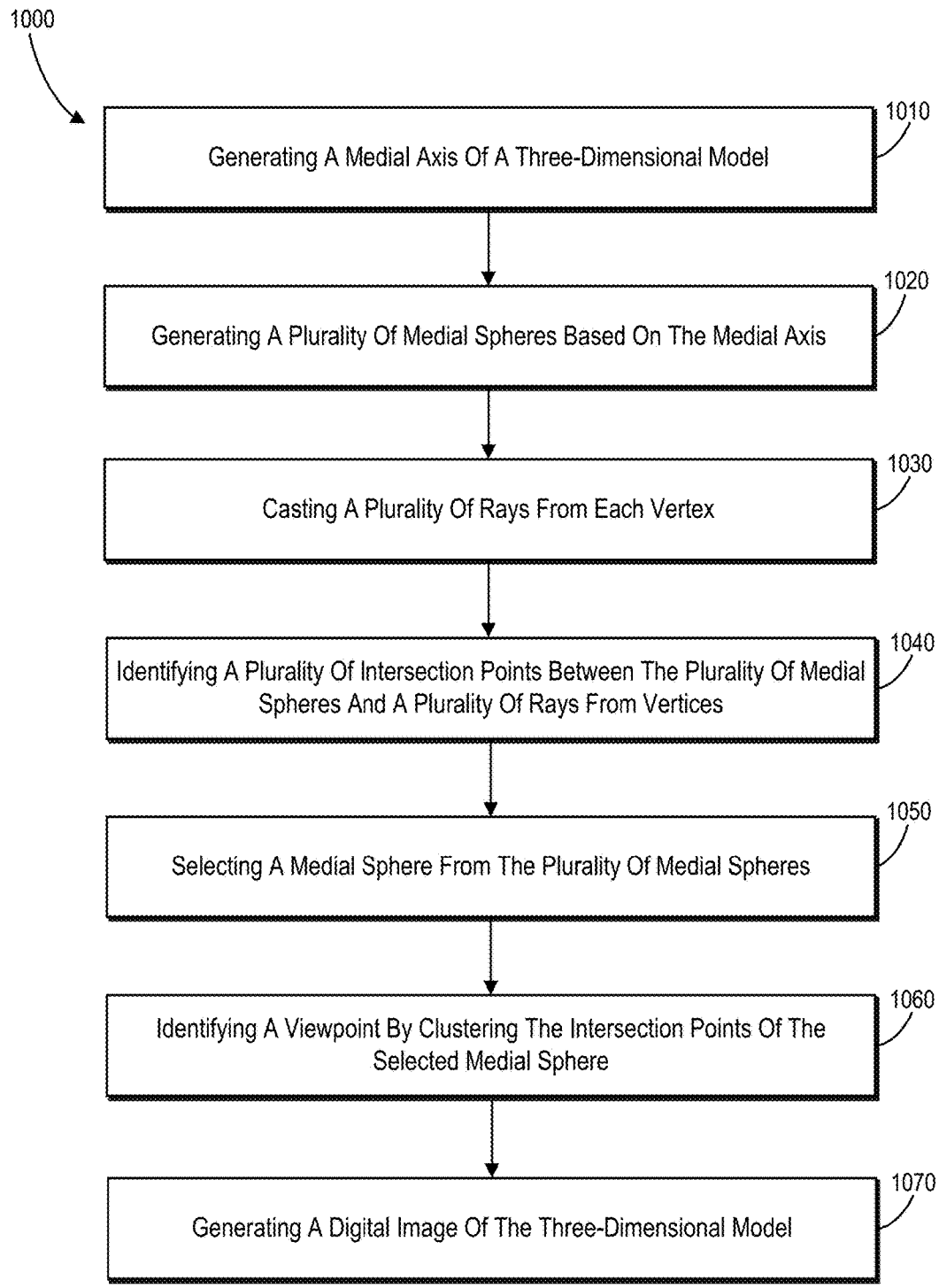
FIG. 10 illustrates a flowchart of a series of acts in another method of of generating viewpoints of defects of a three-dimensional model in accordance with one or more embodiments.
Figure 11:
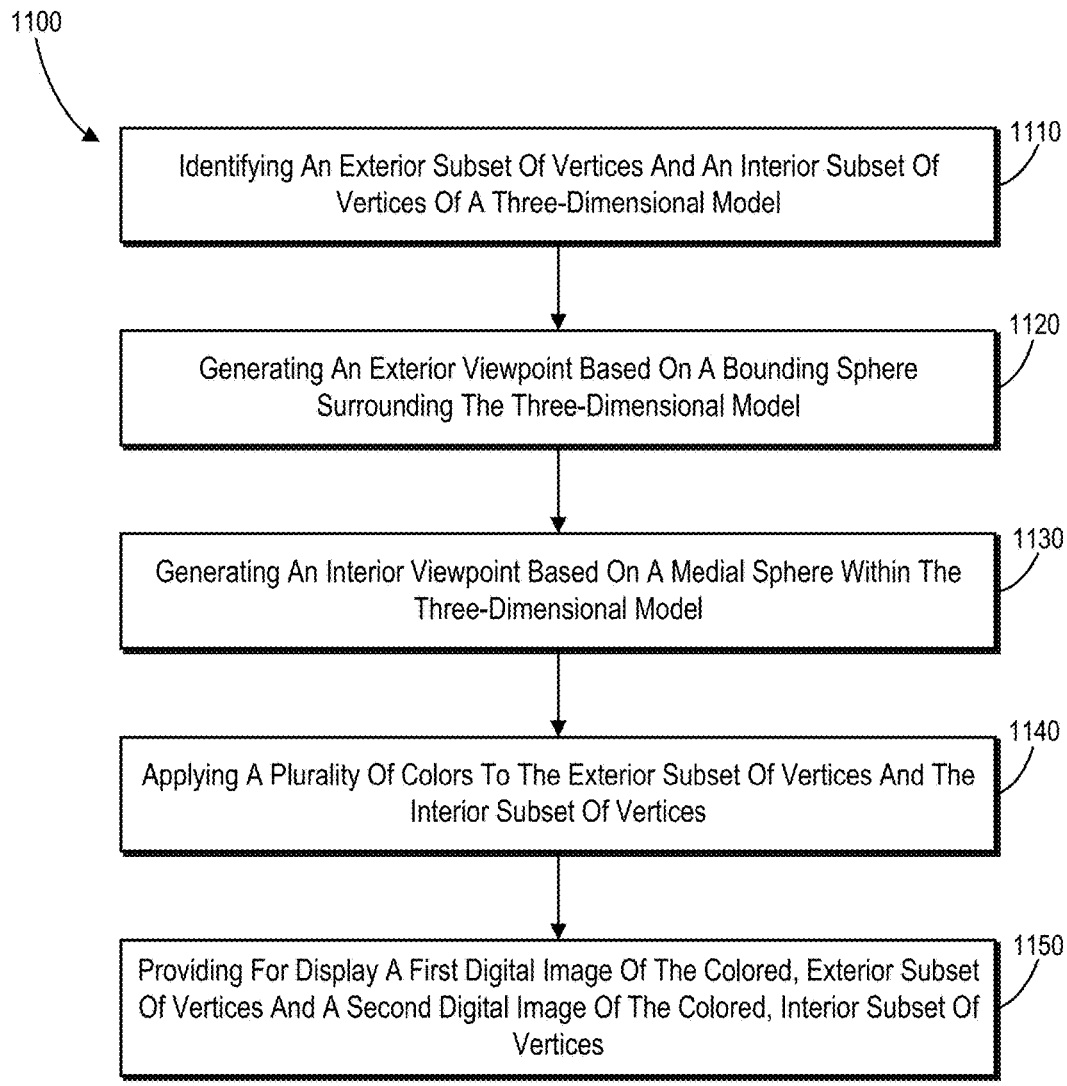
FIG. 11 illustrates a flowchart of a series of acts in another method of of generating viewpoints of defects of a three-dimensional model in accordance with one or more embodiments.

FIGS. 1-8, the corresponding text, and the examples, provide a number of different systems and devices that generate viewpoints and/or digital images illustrating defects in a three-dimensional model. In addition to the foregoing, embodiments can also be described in terms of flowcharts comprising acts and steps in a method for accomplishing a particular result. For example, FIGS. 9-11 illustrate flowcharts of exemplary methods in accordance with one or more embodiments. The methods described in relation to FIGS. 9-11 may be performed with less or more steps/acts or the steps/acts may be performed in differing orders. Additionally, the steps/acts described herein may be repeated or performed in parallel with one another or in parallel with different instances of the same or similar steps/acts.

FIG. 9 illustrates a flowchart of a series of acts in a method 900 of generating viewpoints of defects in a three-dimensional model. In one or more embodiments, the method 900 is performed in a digital medium environment that includes the digital viewpoint generation system 700. The method 900 is intended to be illustrative of one or more methods in accordance with the present disclosure, and is not intended to limit potential embodiments. Alternative embodiments can include additional, fewer, or different steps than those articulated in FIG. 9.

As illustrated in FIG. 9, the method 900 includes an act 910 of generating a bounding sphere about a three-dimensional model. In particular, the act 910 includes generating a bounding sphere that surrounds a three-dimensional model. For example, the act 910 can include selecting a radius of the bounding sphere based on a size of the three-dimensional object. Moreover, the act 910 can include identifying a minimum radius for surrounding the three-dimensional model; and applying a multiplier to the minimum radius to generate the radius of the bounding sphere.

In addition, as shown in FIG. 9, the method 900 also includes an act 920 of identifying vertices associated with one or more defects. In particular, the act 920 can include identifying a set of affected vertices of the three-dimensional model, wherein each vertex of the set of affected vertices is associated with one or more defects. For example, in one or more embodiments, the act 920 comprises identifying a plurality of defects in the three-dimensional model and identifying one or more vertices corresponding to each defect.

Moreover, as shown in FIG. 9, the method 900 also includes an act 930 of generating a plurality of rays from each vertex. In particular, the act 930 can include generating a plurality of rays originating from each vertex of the set of affected vertices toward the bounding sphere. For example, the act 930 can comprise identifying a normal for a vertex of the set of affected vertices; identifying a hemisphere centered on the vertex and oriented to the normal of the bounding sphere; and casting the plurality of rays from the vertex toward the identified hemisphere.

In addition, as illustrated in FIG. 9, the method 900 also includes an act 940 of identifying intersection points between the bounding sphere and the plurality of rays. In particular, the act 940 can include identifying a plurality of intersection points between the bounding sphere and the plurality of rays originating from each vertex of the set of affected vertices.

As illustrated in FIG. 9, the method 900 also includes an act 950 of generating viewpoints by clustering the intersection points. In particular, the act 950 can include generating viewpoints by clustering the plurality of intersection points between the plurality of rays and the bounding sphere. For example, in one or more embodiments, the act 950 includes applying a clustering algorithm to generate a first cluster of intersection points; and generating a viewpoint based on the first cluster of intersection points. For instance, in one or more embodiments, the act 950 comprises identifying a representative point of the first cluster of intersection points. Moreover, the act 950 can include identifying an azimuth and an elevation corresponding to the representative point of the first cluster of intersection points; positioning the viewpoint based on the azimuth and the elevation on the bounding sphere; and orienting the viewpoint based on the azimuth and the elevation.

In addition, as illustrated in FIG. 9, the method 900 also includes an act 960 of generating a digital image of the three-dimensional model from each viewpoint. In particular, the act 960 can include generating a digital image of the three-dimensional model from each viewpoint, each digital image capturing one or more vertices of the set of affected vertices of the three-dimensional model. For example, in one or more embodiments, the act 960 comprises generating a smallest number of digital images, that, between the digital images, include each vertex of the set of affected vertices of the three-dimensional model. In addition, the act 960 can include applying a plurality of colors to the set of affected vertices such that all adjacent connected vertices of the set of affected vertices are different colors.

In one or more embodiments, the method 900 also includes applying the clustering algorithm to identify a second cluster of intersection points; generating a second viewpoint based on the second cluster of intersection points; and providing for display a second digital image of the three-dimensional model from the perspective of the second viewpoint.

In addition, FIG. 10 illustrates another flowchart of a series of acts in a method 1000 of generating viewpoints of defects in a three-dimensional model. As shown, the method 1000 includes an act 1010 of generating a medial axis of a three-dimensional model. In particular, the act 1010 can include generating a medial axis of a three-dimensional model, wherein: the three-dimensional model comprises a plurality of vertices, the plurality of vertices comprise a subset of vertices, and each vertex of the subset of vertices corresponds to at least one defect in the three-dimensional model. For example, in one or more embodiments, the act 1010 comprises generating a medial axis approximating a topological skeleton of a three-dimensional model.

Further, as shown in FIG. 10, the method 1000 also includes an act 1020 of generating a plurality of medial spheres based on the medial axis. In particular, the act 1020 can include generating a plurality of medial spheres within the three-dimensional model, each of the plurality of medial spheres corresponding to a unique position of a plurality of positions on the medial axis. For example, in one or more embodiments, the act 1020 comprises generating each of the plurality of medial spheres with a radius based on a distance between a position of the medial axis corresponding to the medial sphere and the three-dimensional model.

In addition, as illustrated in FIG. 10, the method 1000 also includes an act 1030 of casting a plurality of rays from each vertex. In particular, the act 1030 can include casting a plurality of rays from each vertex of the vertices toward the medial spheres. For example, in one or more embodiments, the act 1030 comprises identifying a normal for a vertex of the vertices; identifying a hemisphere centered on the vertex and oriented to the normal of the bounding sphere; and casting the plurality of rays from the vertex toward the identified hemisphere.

Moreover, as shown in FIG. 10, the method 1000 also includes an act 1040 of identifying a plurality of intersection points between the plurality of medial spheres and a plurality of rays from vertices. In particular, the act 1040 can include identifying a plurality of intersection points between the plurality of medial spheres and the plurality of rays originating from each vertex.

As illustrated in FIG. 10, the method 1000 also includes an act 1050 of selecting a medial sphere from the plurality of medial spheres. In particular, the act 1050 can include selecting a medial sphere from the plurality of medial spheres based on the number of intersection points between the medial sphere and the plurality of rays. For example, in one or more embodiments, the act 1050 comprises selecting the medial sphere with a largest number of intersection points from the plurality of medial spheres. In addition, the act 1050 can comprise selecting one or more additional medial spheres such that each vertex of the subset of vertices corresponds to at least one intersection point on at least one of the medial spheres and the one or more additional medial spheres.

As shown in FIG. 10, the method 1000 also include an act 1060 of identifying a viewpoint by clustering the intersection points of the selected medial sphere. In particular, the act 1060 can include identifying a viewpoint by clustering the intersection points between the medial sphere and the plurality of rays. For example, in one or more embodiments, the act 1080 comprises identifying an azimuth and an elevation of each intersection point on the medial sphere; and generating a first cluster by applying a clustering algorithm to the azimuth and the elevation of each intersection point on the medial sphere. In particular, the act 1080 can include averaging the azimuth and the elevation of each intersection point in the first cluster to generate a first average azimuth and a first average elevation at which the viewpoint is placed; averaging the azimuth and elevation of each intersection point in a second cluster to generate a second average azimuth and a second average elevation at which a second viewpoint is placed; and providing for display a first digital image of the three-dimensional model captured from the first viewpoint and providing for display a second digital image of the three-dimensional model captured from the second viewpoint.

The method 1000 also includes an act 1070 of generating a digital image of the three-dimensional model. In particular, the act 1070 of generating a digital image of the three-dimensional model from the viewpoint capturing one or more of the vertices of the three-dimensional model associated with one or more defects. For example, in one or more embodiments, the act 1070 comprises identifying a normal plane corresponding to each vertex; determining an average normal plane based on the normal plane corresponding to each vertex; generating a cut plane corresponding to the average normal plane; and removing a portion of the three-dimensional model based on the cut plane such that the one or more vertices are illustrated in the digital image.

Moreover, FIG. 11 illustrates another flowchart of a series of acts in a method 1100 of generating viewpoints of defects in a three-dimensional model. In particular, as shown in FIG. 11, the method 1100 includes the act 1110 of identifying an exterior subset of vertices and an interior subset of vertices in a three-dimensional model. For instance, the act 1110 can include identifying an exterior subset of vertices associated with exterior defects and an interior subset of vertices associated with interior defects.

In addition, as shown in FIG. 11, the method 1100 also includes an act 1120 of generating an exterior viewpoint based on a bounding sphere surrounding the three-dimensional model. In particular, the act 1120 can include generating an exterior viewpoint based on a bounding sphere surrounding the three-dimensional model and intersection points between the bounding sphere and rays originating from the exterior subset of vertices. For example, the act 1120 can include, for each vertex of the exterior subset of vertices, generating a plurality of rays originating from the vertex toward a hemisphere oriented to the normal of the vertex; identifying the plurality of intersection points by identifying intersections between the plurality of rays originating from each vertex of the exterior subset of vertices and the bounding sphere; and generating the exterior viewpoint on the bounding sphere by clustering the plurality of intersection points between the plurality of rays and the bounding sphere.

As illustrated in FIG. 11, the method 1100 also includes an act 1130 of generating an interior viewpoint based on a medial sphere within the three-dimensional model. In particular, the act 1130 can include generating an interior viewpoint based on a medial sphere within the three-dimensional model and intersection points between the medial sphere and rays originating from the interior subset of vertices. For example, the act 1130 can include generating a medial axis of the three-dimensional model; generating a plurality of medial spheres within the three-dimensional model, each of the plurality of medial spheres corresponding to a position of a plurality of positions on the medial axis; identifying a plurality of intersection points between the plurality of medial spheres and a plurality of rays originating from each vertex in the interior subset of vertices toward a hemisphere oriented to the normal of the vertex; selecting the medial sphere from the plurality of medial spheres based on a number of intersection points between the medial sphere and the plurality of rays; and generating the interior viewpoint on the medial sphere by clustering the intersection points between the medial sphere and the plurality of rays.

Moreover, as shown in FIG. 11, the method 1100 also includes an act 1140 of applying a plurality of colors to the exterior subset of vertices and the interior subset of vertices. In particular, the act 1140 can include applying a plurality of colors to the exterior subset of vertices and the interior subset of vertices such that all adjacent connected vertices in the exterior subset of vertices and all adjacent connected vertices within the interior subset of vertices are different colors. For example, the act 1140 can include identifying vertices from the exterior subset of vertices and vertices from the interior subset of vertices that are connected within the three-dimensional model; connecting additional vertices from the exterior subset of vertices and additional vertices from the interior subset of vertices based on a threshold distance; and applying a graph coloring algorithm to the connected vertices such that all adjacent connected vertices are different colors.

Furthermore, as illustrated in FIG. 11, the method 1100 also includes an act 1150 of providing for display a first digital image of the colored, exterior subset of vertices and a second digital image of the colored, interior subset of vertices. In particular, the act 1150 can include generating a first digital image of the three-dimensional model and the colored, exterior subset of vertices based on the first viewpoint; and generating a second digital image of the three-dimensional model and the colored, exterior subset of vertices from the second viewpoint.

The method 1100 can also include generating the bounding sphere by selecting a radius of the bounding sphere based on a size of the three-dimensional model; and generating the plurality of medial spheres within the three-dimensional model by selecting a radius of each the plurality of medial spheres based on a distance between the position of the medial axis corresponding to the medial sphere and the three-dimensional model. In addition, in one or more embodiments, the method 1100 also includes correcting one or more of the defects in at least one vertex based on user interaction with at least one of the first digital image or the second digital image; and printing the three-dimensional model with the corrected one or more defects via a three-dimensional printer.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
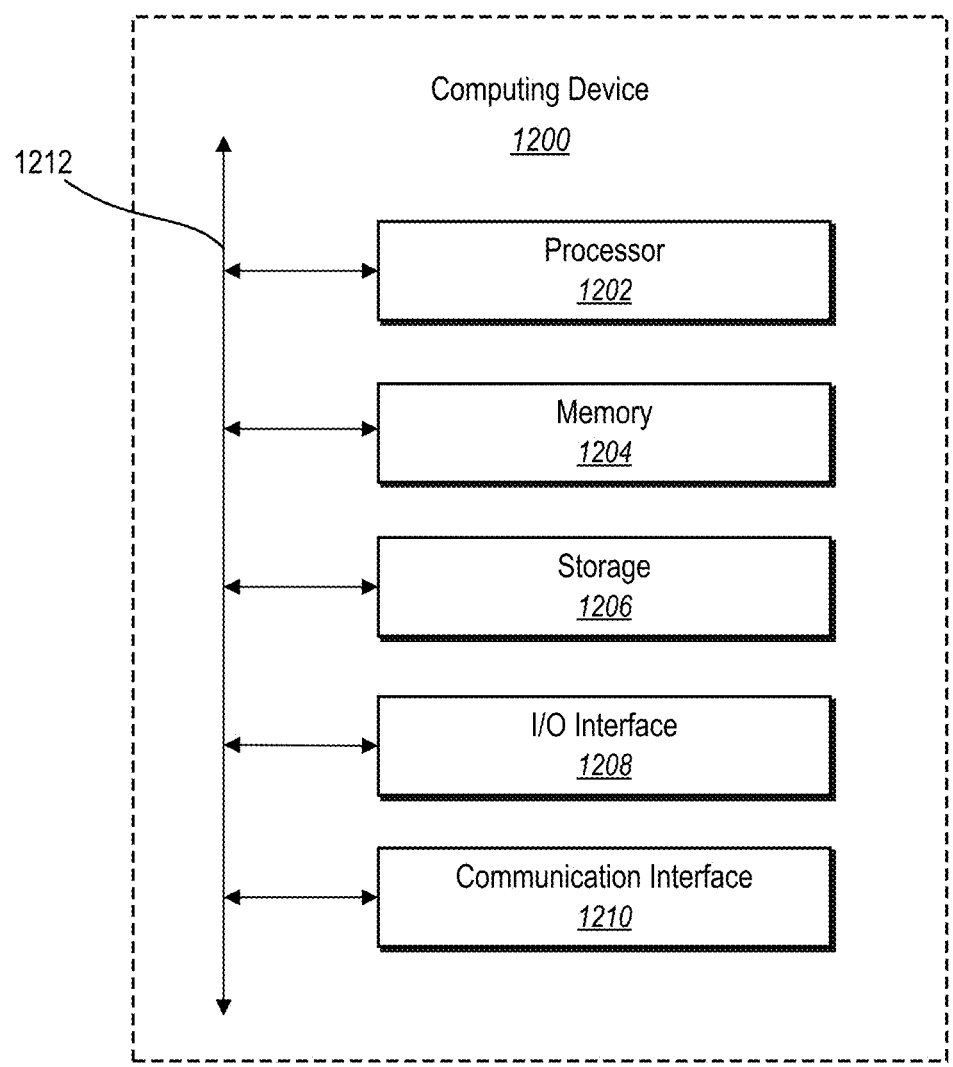
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that the digital viewpoint generation system 700 can comprise implementations of the computing device 1200. As shown by FIG. 12, the computing device can comprise a processor 1202, memory 1204, a storage device 1206, an I/O interface 1208, and a communication interface 1210. In certain embodiments, the computing device 1200 can include fewer or more components than those shown in FIG. 12. Components of computing device 1200 shown in FIG. 12 will now be described in additional detail.

In particular embodiments, processor(s) 1202 includes hardware for executing instructions, such as those making up a computer program. As an example and not by way of limitation, to execute instructions, processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example and not by way of limitation, storage device 1206 can comprise a non-transitory storage medium described above. The storage device 1206 may include a hard disk drive (HDD), flash memory, a Universal Serial Bus (USB) drive or a combination of these or other storage devices.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a stylus or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can comprise hardware, software, or both that couples components of computing device 1200 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. In a digital medium environment for digitally designing and printing three-dimensional objects, a method of generating digital images displaying defects in three-dimensional models to aid in identifying and correcting the defects, the method comprising:

generating a plurality of medial spheres within a three-dimensional model comprising a plurality of vertices and a subset of vertices corresponding to at least one defect;

casting a plurality of rays from the subset of vertices toward the plurality of medial spheres;

identifying a plurality of intersection points between the plurality of medial spheres and the plurality of rays;

selecting a medial sphere from the plurality of medial spheres based on a number of intersection points corresponding to the medial sphere;

identifying a viewpoint by clustering the intersection points corresponding to the medial sphere; and generating a digital image of the three-dimensional model from the viewpoint, the digital image capturing one or more vertices of the subset of vertices of the three-dimensional model associated with one or more defects.

2. The method of claim 1, further comprising:
    identifying a medial axis of the three-dimensional model; and
    generating the plurality of medial spheres based on the medial axis.

3. The method of claim 2, wherein generating the plurality of medial spheres within the three-dimensional model comprises generating a first medial sphere with a radius based on a distance between a position along the medial axis corresponding to the first medial sphere and the three-dimensional model.

4. The method of claim 1, wherein casting the plurality of rays from the subset of vertices toward the plurality of medial spheres comprises:
    identifying a normal for a vertex of the subset of vertices; and
    casting a ray of the plurality of rays from the normal for the vertex.

5. The method of claim 1, wherein selecting the medial sphere comprises selecting the medial sphere with a largest number of intersection points from the plurality of medial spheres.

6. The method of claim 1, wherein identifying the viewpoint comprises:
    identifying an azimuth and an elevation of each intersection point of the intersection points corresponding to the medial sphere; and
    generating a first cluster having a set of intersection points by applying a clustering algorithm to the azimuth and the elevation of each intersection point of the intersection points corresponding to the medial sphere.

7. The method of claim 6, wherein identifying the viewpoint on the medial sphere further comprises:
    averaging an azimuth and an elevation of each intersection point of the set of intersection points corresponding to the first cluster to generate a first average azimuth and a first average elevation at which the viewpoint is placed; and
    providing for display a first digital image of the three-dimensional model captured from the viewpoint.

8. The method of claim 1, wherein generating the digital image of the three-dimensional model from the viewpoint comprises removing part of the three-dimensional model from the viewpoint by:
    identifying a normal plane corresponding to each vertex;
    determining an average normal plane based on the normal plane corresponding to each vertex;
    generating a cut plane corresponding to the average normal plane; and
    removing a portion of the three-dimensional model based on the cut plane such that the one or more vertices from the subset of vertices are illustrated in the digital image.

9. A non-transitory computer readable medium storing instructions thereon that, when executed by at least one processor, cause a computer system to:
    generate a plurality of medial spheres within a three-dimensional model comprising a plurality of vertices and a subset of vertices corresponding to at least one defect;
    cast a plurality of rays from the subset of vertices toward the plurality of medial spheres;
    identify a plurality of intersection points between the plurality of medial spheres and the plurality of rays;
    select a medial sphere from the plurality of medial spheres based on a number of intersection points corresponding to the medial sphere;
    identify a viewpoint by clustering the intersection points corresponding to the medial sphere; and
    generate a digital image of the three-dimensional model from the viewpoint, the digital image capturing one or more vertices of the subset of vertices of the three-dimensional model associated with one or more defects.

10. The non-transitory computer readable medium of claim 9, further comprising instructions that, when executed by the at least one processor, cause the computer system to:
    identify a medial axis of the three-dimensional model; and
    generate the plurality of medial spheres based on the medial axis.

11. The non-transitory computer readable medium of claim 10, further comprising instructions that, when executed by the at least one processor, cause the computer system to generate the plurality of medial spheres within the three-dimensional model by generating a first medial sphere with a radius based on a distance between a position along the medial axis corresponding to the first medial sphere and the three-dimensional model.

12. The non-transitory computer readable medium of claim 9, further comprising instructions that, when executed by the at least one processor, cause the computer system to cast the plurality of rays from the subset of vertices toward the plurality of medial spheres by:
    identifying a normal for a vertex of the subset of vertices; and
    casting a ray of the plurality of rays from the normal for the vertex.

13. The non-transitory computer readable medium of claim 9, further comprising instructions that, when executed by the at least one processor, cause the computer system to select the medial sphere by selecting the medial sphere with a largest number of intersection points from the plurality of medial spheres.

14. The non-transitory computer readable medium of claim 9, further comprising instructions that, when executed by the at least one processor, cause the computer system to identify the viewpoint by:
    identifying an azimuth and an elevation of each intersection point of the intersection points corresponding to the medial sphere; and
    generating a first cluster having a set of intersection points by applying a clustering algorithm to the azimuth and the elevation of each intersection point of the intersection points corresponding to the medial sphere.

15. The non-transitory computer readable medium of claim 14, further comprising instructions that, when executed by the at least one processor, cause the computer system to identify the viewpoint on the medial sphere by:
    averaging an azimuth and an elevation of each intersection point of the set of intersection points corresponding to the first cluster to generate a first average azimuth and a first average elevation at which the viewpoint is placed; and
    providing for display a first digital image of the three-dimensional model captured from the viewpoint.

16. The non-transitory computer readable medium of claim 9, further comprising instructions that, when executed by the at least one processor, cause the computer system to generate the digital image of the three-dimensional model from the viewpoint by removing part of the three-dimensional model from the viewpoint by:
    identifying a normal plane corresponding to each vertex;
    determining an average normal plane based on the normal plane corresponding to each vertex;

generating a cut plane corresponding to the average normal plane; and removing a portion of the three-dimensional model based on the cut plane such that the one or more vertices of the subset of vertices are illustrated in the digital image.

17. A system comprising:

at least one processor; and at least one non-transitory computer readable storage medium storing instructions that, when executed by the at least one processor, cause the system to:

generate a medial axis of a three-dimensional model, wherein: the three-dimensional model comprises a plurality of vertices, the plurality of vertices comprise a subset of vertices, and each vertex of the subset of vertices corresponds to at least one defect in the three-dimensional model;

generate a plurality of medial spheres within the three-dimensional model, each of the plurality of medial spheres corresponding to a unique position of a plurality of positions on the medial axis;

cast a plurality of rays from each vertex of the subset of vertices toward the plurality of medial spheres;

identify a plurality of intersection points between the plurality of medial spheres and the plurality of rays originating from each vertex;

select a medial sphere from the plurality of medial spheres based on a number of intersection points between the medial sphere and the plurality of rays;

identify a viewpoint by clustering the intersection points between the medial sphere and the plurality of rays; and generate a digital image of the three-dimensional model from the viewpoint, the digital image capturing one or more vertices of the subset of vertices of the three-dimensional model associated with one or more defects.

18. The system of claim 17, further comprising instructions that, when executed by the at least one processor, cause the system to identify the viewpoint by:

identifying an azimuth and an elevation of each intersection point on the medial sphere; and generating a first cluster by applying a clustering algorithm to the azimuth and the elevation of each intersection point on the medial sphere.

19. The system of claim 18, further comprising instructions that, when executed by the at least one processor, cause the system to identify the viewpoint on the medial sphere by:

averaging the azimuth and the elevation of each intersection point in the first cluster to generate a first average azimuth and a first average elevation at which the viewpoint is placed;

averaging the azimuth and elevation of each intersection point in a second cluster to generate a second average azimuth and a second average elevation at which a second viewpoint is placed; and providing for display a first digital image of the three-dimensional model captured from the viewpoint and providing for display a second digital image of the three-dimensional model captured from the second viewpoint.

20. The system of claim 17, further comprising instructions that, when executed by the at least one processor, cause the system to generate the digital image of the three-dimensional model from the viewpoint by removing part of the three-dimensional model from the viewpoint by:

identifying a normal plane corresponding to each vertex;

determining an average normal plane based on the normal plane corresponding to each vertex;

generating a cut plane corresponding to the average normal plane; and removing a portion of the three-dimensional model based on the cut plane such that the one or more vertices of the subset of vertices are illustrated in the digital image.

* * * * *